United States Patent [19]

Coraluppi et al.

[11] Patent Number: 4,654,842
[45] Date of Patent: Mar. 31, 1987

[54] REARRANGEABLE FULL AVAILABILITY MULTISTAGE SWITCHING NETWORK WITH REDUNDANT CONDUCTORS

[76] Inventors: Giorgio L. Coraluppi, 234 Conover Rd., Pittsburgh, Pa. 15208; John L. Driscoll, R.F.D. 1, Box 330A, Jeanette, Pa. 15644; David C. Jacobs, 471 Parkridge Dr., Bethel Park, Pa. 15102; Edward K. H. Law, 2535 King Lear Dr., Apartment #19, Monroeville, Pa. 15146; Gerald M. Masson, 1 Midvale Rd., Baltimore, Md. 21210

[21] Appl. No.: 636,913

[22] Filed: Aug. 2, 1984

[51] Int. Cl.$^4$ .................. H04J 1/16; H04Q 11/04
[52] U.S. Cl. .......................... 370/16; 370/58; 340/825.8
[58] Field of Search ............ 370/58, 59, 63, 16; 340/825.8, 825.89; 179/18 GE

[56] References Cited

U.S. PATENT DOCUMENTS

| | | | |
|---|---|---|---|
| 3,657,483 | 4/1972 | Bosonnet et al. | 370/58 |
| 3,760,103 | 9/1973 | Condon | 370/58 |
| 4,038,638 | 7/1977 | Hwang | 340/825.89 |
| 4,074,077 | 2/1978 | Charransol et al. | 370/58 |
| 4,123,624 | 10/1978 | Gagnier et al. | 370/58 |
| 4,198,546 | 4/1980 | Schlichte | 370/58 |
| 4,455,645 | 6/1984 | Mijioka et al. | 370/16 |

*Primary Examiner*—Douglas W. Olms
*Assistant Examiner*—Frank M. Scutch, III
*Attorney, Agent, or Firm*—Reed Smith Shaw & McClay

[57] ABSTRACT

A rearrangeable fully available multistage switching network having $N_T$ inputs and $M_T$ outputs, preferably where $N_T = M_T$, comprising a plurality of switching elements arranged in an array of $\theta$ stages, where $\theta \geq 3$. The inner groups of stages define a plurality of nested modules where each of the switches in an outer stage is connected to associated subordinate inner modules such that at least one set, $f_i$, of said connections between stages is redundant, that is, greater than 1.

12 Claims, 16 Drawing Figures

FIG. 1 (9 STAGE)

FOLDED NETWORK

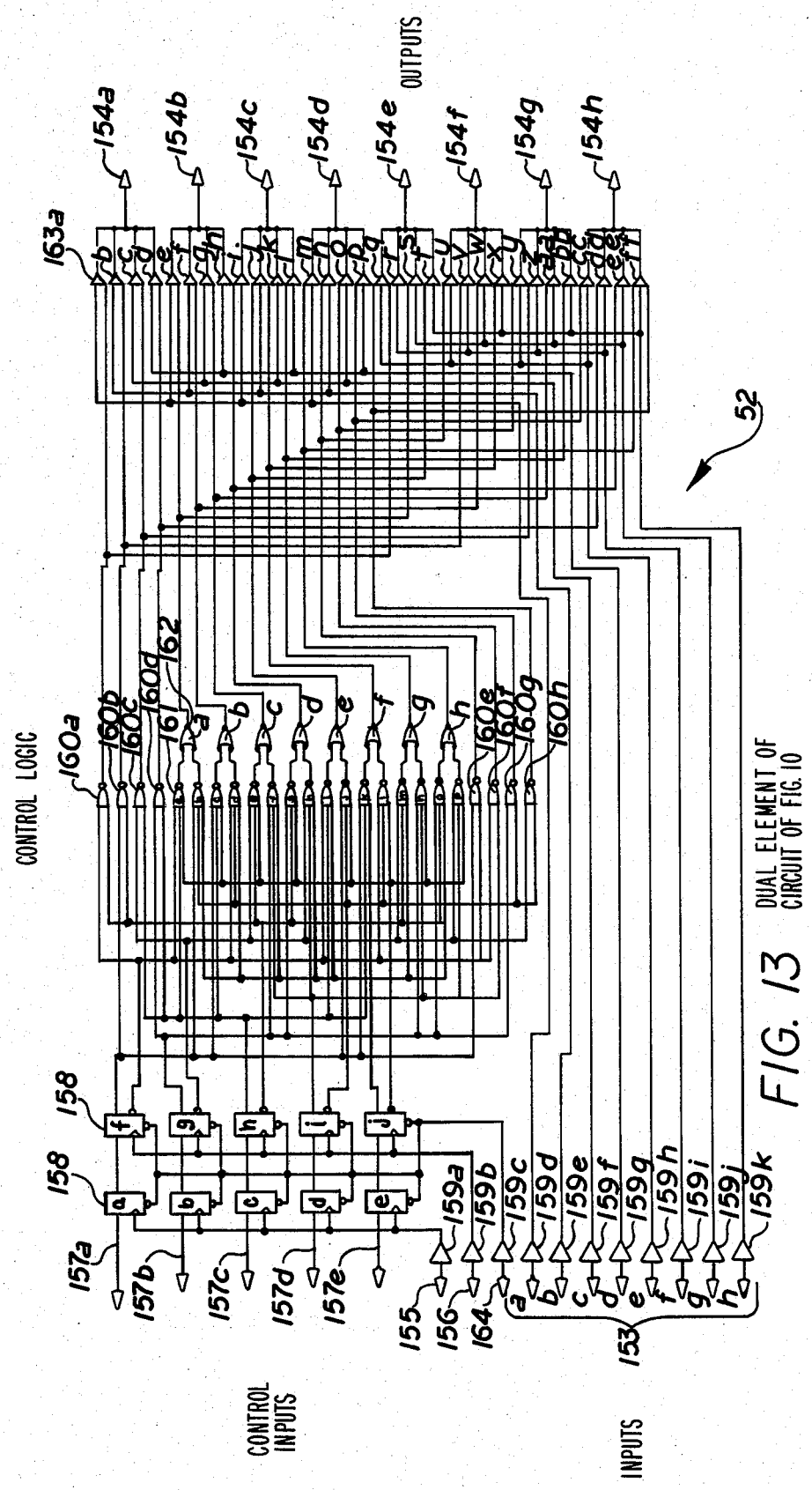
FIG. 13 DUAL ELEMENT OF CIRCUIT OF FIG. 10

REARRANGEABLE FULL AVAILABILITY MULTISTAGE SWITCHING NETWORK WITH REDUNDANT CONDUCTORS

FIELD OF THE INVENTION

The invention relates to a multistage rearrangeable fully available network, and in particular, to a fully available, rearrangeable network having redundant conductors to alleviate the need for rearrangement and to facilitate rearrangement when needed.

BACKGROUND OF THE INVENTION

The invention relates to a multistage switching network which is useful in telephonic communication and, in particular, cellular mobile radio-telecommunication systems. Rearrangeable switching networks are known in the art, for example, U.S. Pat. Nos. 4,023,141; 3,978,291; 3,358,269; 3,129,407; 3,258,269; 4,038,638 and 4,022,982.

A rearrangeable full availability network is one in which a successful connection of any idle pair of terminals is guaranteed even though this may require the rearrangement of existing connections. While this same "guarantee" can be achieved in a "strictly nonblocking" network, such networks are larger and more expensive than networks with which the present invention is concerned.

The requirements of cellular mobile telecommunications place additional demands on the switching network employed in such systems. In a cellular system, a service area is typically divided into relatively small "cells," each cell having one or more radio antennae and a base station. All base stations are connected, via land lines to a Mobile Telecommunications Switching Office (MTSO) which serves as the control center for the system and which is also linked to the regular telephone network.

Mobile calls are initiated by the transmission of source and destination data over special "set-up" channels to the nearest base station which relays the signal to the MTSO. If the target unit (the number that was dialed) is a land-line telephone, the MTSO initiates a connection with the regular telephone network after assigning a pair of voice-channels to the mobile unit. If the target is mobile, the MTSO circulates a paging signal from one base station to the next until the target is located. The target responds by transmitting an acknowledgment to its local base station which is then relayed to the MTSO.

A mobile unit continues to use its assigned pair of channels for as long as it remains within its original (or current) cell. However, when a unit moves from one cell to another, a procedure, referred to as a "hand-off," is initiated. This procedure involves a further data exchange over the special set-up channel, the assignment of a new channel pair and the routing of the call to a new base station.

In normal telephone systems, once a connection is made it remains in effect until the conversation is terminated. On the other hand, due to hand-offs, the connecting paths in the cellular system are frequently broken and remade while the conversation is in progress. Clearly, therefore, the nature of the cellular system is such that it imposes a set of unique and stringent functional requirements on the switching network it employs. Specifically, the network must have full availability so that reconnections made during a hand-off can be guaranteed. For the same reason, the network must be highly reliable and have provisions for detecting and avoiding a faulty path and then detecting and isolating a faulty component for repair. Also, the reconnections or hand-offs should be transparent to the users, i.e., there should be no telltale discontinuities in ongoing conversations or loss of any data during hand-offs. Finally, reconnections must be made expeditiously and the design of the system must be such as to facilitate efficient control algorithms.

In the current state-of-the-art networks, all of the performance objectives associated with cellular radio-telecommunications cannot be achieved, or if achieved, the networks are relatively large and expensive and/or their architectures do not facilitate expeditious reconnections nor do they facilitate efficient control algorithms. Moreover, the state-of-the-art networks do not readily accommodate additions to their subscriber/user base. For example, in such a network having $N_T$ input/output terminals, additions to the network normally increase by a rate proportional to $N_T \log_2 (N_T)$, rather than linearly with $N_T$.

It is, therefore, an objective of the present invention to provide a rearrangeable fully available switching network useful for both voice and data transmission that meets all of the functional requirements of a cellular mobile radio-telecommunications system, but which can also be used in Private Automatic Branch Exchange (PABX) systems. Specifically, it is an objective of the invention:

(1) to provide a general multistage network configuration predicated on the use of redundant conductors between stages which, when compared to state-of-the-art networks, greatly reduces the probability of having to rearrange existing connections in order to connect an idle pair of terminals and which simplifies the process when rearrangement is required;

(2) to provide a network configuration which facilitates path verification through the network and which facilitates the process of locating and isolating faulty components;

(3) to provide conformable specific embodiments of the general network in which the least reducible element is a printed circuit board and in which all of the printed circuit boards are identical, throughout the network;

(4) to provide conformable specific embodiments of the general network which permit the growth of the network, in terms of such printed circuit boards, to be directly proportional to the total number of input and output terminals required;

(5) to provide conformable specific embodiments of the general network which permit the use of such printed circuit boards which are dual switching elements each of which consists of two disjoint elements with a common controller to effectively reduce the total number of such printed circuit boards by approximately one-half.

THE INVENTION

The present invention is a multistage rearrangeable, fully available switching network having $N_T$ inputs and $N_T$ outputs. The network comprises a plurality of fully available switching elements arranged in an array of stages. Inner groups of stages define a plurality of nested modules such that each switch in an outer stage is connected to all associated or subordinate inner modules wherein at least one set of such connections linking stages is redundant. In the present invention, the series of nested sets of successively smaller networks which, when the number of stages is odd, typically results in the innermost nesting level being a single switching element and two switching elements when the number is even. In considering the description of the invention it is useful to refer to FIG. 1 to more fully understand the nesting concept.

The network is subdivided into $\theta$ stages. In the present invention, $\theta$ may be either an odd or even integer such that if the number of stages of switches is odd, then $\theta \geq 3$ and if even, then $\theta \geq 4$. In describing the network, "i" is used to designate any stage in the network, where $i=1,2,3,\ldots,\theta$. $l$ is used to designate the center stage when $\theta$ is odd, such that $$l=(\theta+1)/2. \tag{1a}$$

When $\theta$ is even, $$l=\theta/2. \tag{1b}$$

Each stage in the network preferably comprises strictly nonblocking switching elements each of which is referred to herein as a Least Reduceable Element (LRE). All LRE's in the i-th stage preferably have $K_i$ inputs and $K_i$ outputs and, thus, have a size $K_i \times K_i$. If $\theta$ is even, there is no general requirement that the LRE's in one stage be equal in size to the LRE's in adjacent stages, except for the l-th and (l+1)-th stages.

If $\theta$ is odd, then, for $i<l$ and if $\theta$ is even, then for $i\leq l$ the i-th stage of the network is the mirror-image of the $(\theta-i+1)$-th stage and stages $i$ and $(\theta-i+1)$ are said to be complementary stages. All LRE's in complementary stages are of equal size and $K_i \equiv K_{(\theta-i+1)}$. Likewise, LRE's occupying mirror-image positions in complementary stages are said to be mirror-image LRE's. Thus, for example, in FIG. 1, LRE's $LRE_L(2,1)$ and $LRE_R(2,1)$ are mirror-image LRE's.

In the present invention, LRE's within and bounded by complementary stages are grouped into one or more subsets, each of which is referred to as a module. As used herein, $j$ designates the module-group comprised of LRE's in stages $j$ to $(\theta-j+1)$, where $j\leq l$.

If $\theta$ is odd, then each LRE in the l-th stage is also a module which belongs to module-group $j=l$. If $\theta$ is even, then the $j=l$-th module-group is a pair of LRE's.

Each module in the j-th module-group is itself a fully available square switching network having $(\theta-2j+2)$ stages, $N_j$ inputs and $N_j$ outputs, and, if $j=l$, then $N_l \equiv K_l$.

The number and configurations of the LRE's within all modules of the j-th module-group are identical and therefore, all modules in module-group $j$ are said to be identical.

The entire switching network is deemed to be a module which is designated the $j=1$ module-group. Where $1\leq j\leq l$, each module contains a series of nested sets of successively smaller modules and, such that for $2\leq j\leq l$, $S_j$ is the number of modules of module-group $j$ which nest within a larger module of the $(j-1)$-th module-group.

$M(j,k_2,k_3,\ldots,k_{j-1},k_j)$ is the identity of the $k_j$-th module in the j-th module-group which nests within the $k_{(j-1)}$-th module of module-group $(j-1)$, which nests within ..., which nests within the $k_2$-th module of module-group $j=2$ where, for all $j$, $1\leq k_j \leq S_j$. This arrangement is illustrated in FIG. 1.

Module $M(j,k_2,k_3,\ldots,k_{j-1},k_j)$ is nested within module $M(j-1,k_2,k_3,\ldots,k_{j-1})$ thereby making module $M(j,k_2,k_3,\ldots,k_{j-1},k_j)$ a subordinate module to module $M(j-1,k_2,k_3,\ldots,k_{j-1})$ and the latter module is a superordinate module to module $M(j,k_2,k_3,\ldots,k_{j-1},k_j)$.

Where $1\leq i\leq l$, $R_i$ is the number of LRE's comprising the i-th stage of the network which are contained within each module of module-group $j=i$. By reason of symmetry, $R_i$ is the number of LRE's comprising the $(\theta-i+1)$-th stage of the network which are contained within each module of module-group $j=i$. Furthermore, if $\theta$ is odd, the l-th module is a single LRE and when $\theta$ is even, it is a pair of mirror-image LRE's, and therefore, $R_l \equiv 1$.

For $j<l$ ($\theta$ is odd) or $j\leq l$ ($\theta$ is even), $LRE_L(X,k_2,k_3,\ldots,k_j)$ is the identity of the X-th LRE in the sequence of j-th stage LRE's in module $M(j,k_2,k_3,\ldots,k_j)$, where $1\leq X\leq R_j$. On the other hand, for $j>l$ ($\theta$ is odd) or $j\geq(l+1)$ ($\theta$ is even) $LRE_R(X,k_2,k_3,\ldots,k_j)$ is the identity of the X-th LRE in the sequence of $(\theta-j+1)$-th stage LRE's in module $M(j,k_2,k_3,\ldots,k_j)$ where $i\leq X\leq R_j$. Thus, the pair of LRE's, $LRE_L(X,k_2,k_3,\ldots,k_j)$ and $LRE_R(X,k_2,k_3,\ldots,k_j)$ are mirror-image LRE's as illustrated in FIG. 1.

If $\theta$ is odd, then, since each LRE in the l-th stage is a module, the pivot LRE's have the singular designation $M(l,k_2,k_3,\ldots,k_l)$, where $1\leq k_l\leq S_l$.

In the present invention each LRE in an outer stage of a superordinate module is linked to all subordinate modules. The number of conductors from each LRE, when $i\leq l$, in the set of LRE's $LRE_L(X,k_2,k_3,\ldots,k_i)$, for $1\leq X\leq R_i$, linked to each module in the subordinate set of modules $M(i+1,k_2,k_3,\ldots,k_i,k_{i+1})$ where $1\leq k_{i+1}\leq S_{i+1}$ is $f_i$. Similarly, for $i\leq l$, $f_i$ is the number of conductors from each module in the subordinate set $M(i+1,k_2,k_3,\ldots,k_i,k_{i+1})$, linked to each LRE in the set of LRE's $LRE_R(X,k_2,k_3,\ldots,k_i)$, where $1\leq X\leq R_i$. FIG. 1 illustrates a linkage pattern in which $f_i=2$ for all values of i. However, as described hereinafter, only one set of conductors needs to be greater than 1. When $f_i$ is greater than 1, those conductors are said to be identified redundant conductors.

If $\theta$ is even, any output from any LRE in the l-th stage may be linked to any input to any LRE in the (l+1)-th stage, and there is no general requirement that the LRE's so connected be mirror-image LRE's.

If $\theta$ is odd, each module in module-group $j=l-1$ is a three stage network and $S_l$ is the number of LRE's within the center stage of each of the three stage modules. Accordingly, it is a particular feature of this invention that $R_{(l-1)} \equiv S_l \equiv R_{(l+1)}$, when $\theta$ is odd.

For $2\leq j\leq l$, $N_j$ is the total number of conductors received by each module in the subordinate set of modules $M(j,k_2,k_3,\ldots,k_{j-1},k_j)$, where $1\leq k_j\leq S_j$, from LRE's in the LRE set $LRE_L(X,k_2,k_3,\ldots,k_{j-1})$, where $1\leq X\leq R_{j-1}$. Similarly, when $2\leq j\leq l$, $N_j$ is the quantity of conductors received by LRE's in LRE set $LRE_R(X,k_2,k_3,\ldots,k_{j-1})$, where $1\leq X\leq R_{j-1}$, from each module in the subordinate set of modules $M(j,k_2,k_3,\ldots,k_{j-1},k_j)$, where $1\leq k_j\leq S_j$.

As discussed previously, the entire switching network is itself a module; therefore, by definition, $S_1=1$ and $N_1 \equiv N_T$. Furthermore, for the first stage, $$R_1=\lceil N_T/K_1 \rceil, \tag{2}$$

where the notation [A] is defined herein to mean the smallest integer $\geq A$.

When $2 \leq i \leq l$, the distributions of the modules, intermodule conductors and intra-module LRE's, respectively, are given by the equations $$S_i = K_{(i-1)}/f_{(i-1)}, \quad (3)$$

$$N_i = f_{(i-1)} \cdot R_{(i-1)}, \quad (4)$$

and $$R_i = [N_i/K_i]. \quad (5)$$

In order that the network have full availability, the following necessary condition must prevail for $1 \leq i \leq l$:

$$\left( K_i \cdot R_i \prod_{j=1}^{i} S_j \right) \geq N_T. \quad (6)$$

Furthermore, the satisfaction of Equations (3), (4), (5) and (6) assures a sufficient number of modules and LRE's for full availability as shown hereinafter.

$R_T$ is the total number of LRE's used to construct the network such that based on the nesting concept, $$R_T = 2 \cdot \sum_{i=1}^{\Psi} \left( R_i \cdot \prod_{j=1}^{i} S_j \right) + \xi \cdot S_I \cdot \prod_{j=1}^{\Psi} S_j, \quad (7)$$

where $\Psi = l - 1$, when $\theta$ is odd and $\Psi = l$, when $\theta$ is even and $\xi = 1$, when $\theta$ is odd and $\xi = 0$ and when $\theta$ is even.

The importance of redundant conductors on the configuration of the network can be seen in terms of Equation (3) and the recursion obtained by combining Equations (4) and (5), i.e., $$R_i = \quad (8)$$

$$\left[ \left[ \cdots \left[ \left[ \frac{N_T}{K_1} \right] \cdot f_1 \right] \frac{1}{K_2} \right] \cdots \right] \cdot f_{i-1} \right] \frac{1}{K_i} \right].$$

Thus, for any $i < l$, when $f_i > 1$, the required number of modules in module-group $j = i + 1$ is reduced according to Equation (3) relative to the situation where $f_i = 1$ and the number of LRE's in each module of the j-th module-group and in all of their subsequent subordinate modules increases according to Equation (8). This decrease in the number of modules in the j-th module group according to Equation (3) is referred to as compaction. The result of compaction is to provide a significantly more powerful connectivity to the network. This connectivity distinguishes the present invention from those of the prior art.

The increase in connectivity resulting from compaction is readily apparent when compared to known, fully available, networks that do not use compaction (i.e., $f_i = 1$, $1 \leq i \leq l - 1$) but satisfy Equation (3), such as the state-of-the-art networks described by V. E. Benes in "Mathematical Theory of Connecting Networks for Telephone Traffic" Academic Press (1965).*

*Suppose that for a present state of the art network, some $f_i$, for $1 \leq i \leq l - 1$, is increased to, say, 2. In other words, in the original design, $f_i = 1$, but in the new design, $f_i = 2$. This means that in the new network $S'_{i+1} = [K_i/2]$ and $N'_{i+1} = 2N_{i+1}$. Hence the (i+1)-th module-group in the new network consists of approximately one-half of the number of modules of the original network, where each of these modules $M(i+1, k_2, k_3, \ldots, k_i, k_{i+1})$, is itself a fully available subnetwork of size $(2N_{i+1} \times 2N_{i+1})$ to which each $LRE_t(X, k_2, \ldots, k_i)$ has $f_i = 2$ links and from which each $LRE_R(X, k_2, \ldots, k_i)$ receives $f_i = 2$ links. Because of the full availability of the original network and because each of the modules of the (i+1)-th module-group is also a fully available subnetwork, the new network is fully available. Extending the above argument to the more general case where more than one $f_i > 1$ is straightforward. Hence, compacted networks satisfying Equations (3) through (6) are fully available.

Equally important to retaining full availability, the compacted network of the present invention has improved performance in terms of a lower probability of having to rearrange existing connections in order to satisfy a new input-to-output assignment, and a larger selection of rearrangements (and, therefore, a potentially simpler rearrangement) when the state of the network is such that the rearrangements cannot be avoided. For example, for any j-th module-group, when $f_{(j-1)} = 1$ and a rearrangement between modules is necessary, a corresponding rearrangement may not be necessary if $f_{(j-1)} > 1$. However, if there is no need to rearrange when $f_{(j-1)} > 1$, there may still exist a need if $f_{(j-1)} = 1$. Furthermore, when $f_{(j-1)} > 1$ and a rearrangement between modules of the j-th module-group is necessary, the redundant conductors will, in general, increase the total number of sequences available for interchanging the busy connecting paths between modules.

Combining Equations (3), (7) and (8), yields for the total number of LRE's in a general compacted network as follows:

$$R_T = 2 \cdot \left[ \frac{N_T}{K_1} \right] + 2 \cdot \quad (9)$$

$$\sum_{i=2}^{\Psi} \left[ \left[ \cdots \left[ \left[ \frac{N_T}{K_1} \right] \frac{1}{K_2} \right] \cdots \right] \frac{1}{K_i} \right] \cdot \prod_{j=1}^{(i-1)} K_j +$$

$$\xi \left[ \left[ \cdots \left[ \left[ \frac{N_T}{K_1} \right] \frac{1}{K_2} \right] \cdots \right] \frac{1}{K_I} \right] \cdot \prod_{j=1}^{(I-1)} K_j.$$

In a preferred embodiment of the present invention the LRE's in all stages of the network are of equal size such that, for all values of $1 \leq i \leq l$, $K_i = K$, and $K$ and $N_T$ have values such that $$MOD(N_T, K^{(l-1)}) = 0, \quad (10)$$

and $$K^{(l-1)} \leq N_T \cdot \prod_{i=1}^{(l-1)} f_i \leq K^l. \quad (11)$$

Subject to these conditions, the size of Equation (9) is directly proportional to the number of stages and to the number of input/output terminals, namely, $$R_T = \theta \cdot N_T/K \quad (12)$$

When $$N_T \cdot \prod_{i=1}^{(l-1)} f_i = K^l, \quad (13)$$

the network reaches its maximum size relative to $\theta, K, f_1, f_2, \ldots,$ and $f_{(l-1)}$ and it is said to be saturated. In this regard, Equation (13) defines the point of saturation.

Typical growth curves for networks derived from the principles of the present invention and subject to the constraints of Equations (10) and (11) are shown in FIG. 2; these curves are for $\theta = 3$, 5 and 7 and for $K = 8$, 16 and 32.

The characteristics and advantages of the network of the present invention will become apparent from a perusal of the detailed description of the presently preferred embodiments taken in connection with the accompanying drawings.

DESCRIPTION OF THE DRAWINGS

FIG. 13 is one specific circuit diagram for the (4×4) switch element of the LRE shown in FIG. 9 when that LRE is a dual element.

PRESENTLY PREFERRED EMBODIMENT

A. The Network

Figure 3:
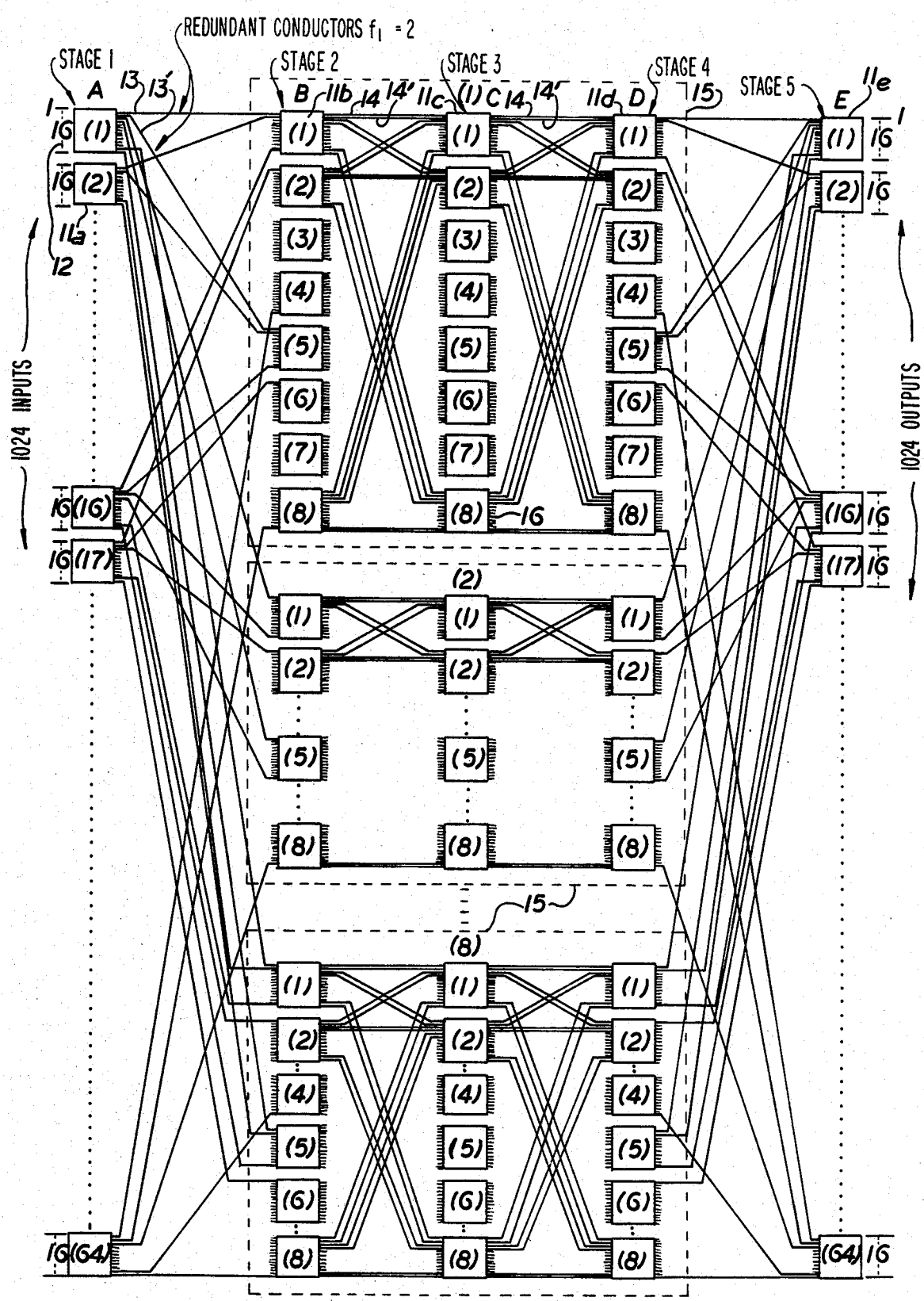
FIG. 3 is a general schematic drawing of a five stage compacted network using redundant conductors.

Referring to FIG. 3, switching network 10 is a rearrangeable, fully available network in which the successful connection of any pair of idle terminals is guaranteed, although this might require the rearrangement of existing connections.

In the specific embodiment of FIG. 3, there are 1024 inputs to and 1024 outputs from the network (i.e., $N_T = 1024$), five stages (i.e., $\theta = 5$); each stage A through E consists of a series of identical square LRE's 11.

According to the invention, each LRE 11 within the network 10 is either a single printed circuit board (PCB) or a group of PCB's connected to form a larger LRE 11. In this particular embodiment, each LRE 11 in stage A is a PCB with 16 input conductors 12 and 16 output conductors 13 (i.e., $K = 16$). Likewise, each LRE 11 in stage B is a PCB with 16 input conductors 13 and 16 output conductors 14. As can be seen, output conductors from LRE's 11 in one stage, e.g., A, B, C and D of network 10 are the input conductors to LRE's 11 in the next stages, e.g., B, C, D and E, respectively. Thus, the 1024 inputs to network 10 pass as 1024 conductors from one stage to the next, terminating at stage E, the last (i.e., fifth) stage, with 1024 outputs.

The number of LRE's 11 in outer stages A and E is computed by dividing the total number of input/outputs to the network by the number of terminal connections on a single LRE (i.e., $R_1 = R_5 = 1024/16 = 64$).

Figure 1:
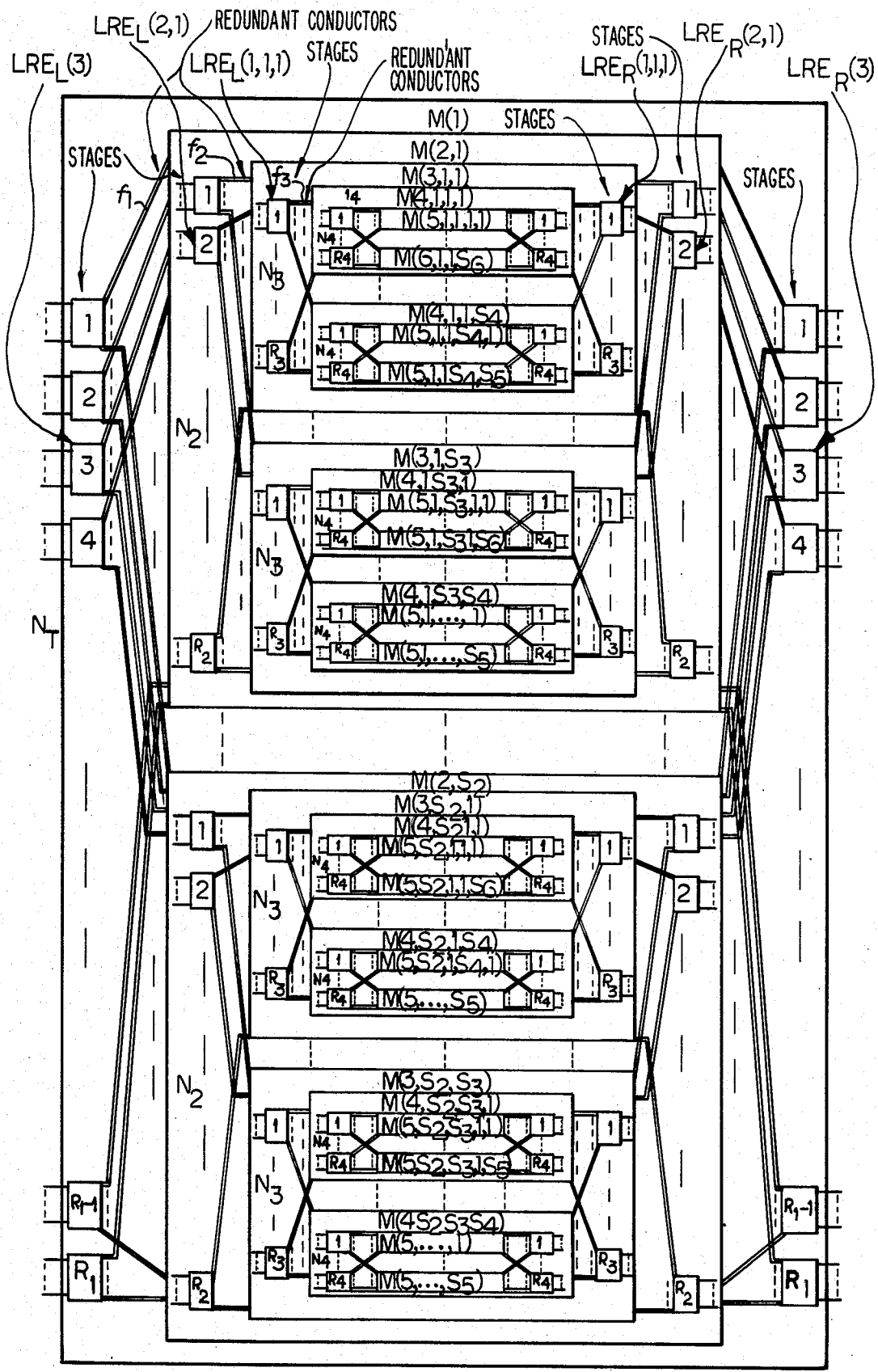
FIG. 1 shows a general compacted network illustrating the designations of modules and LRE's.
Figure 2:
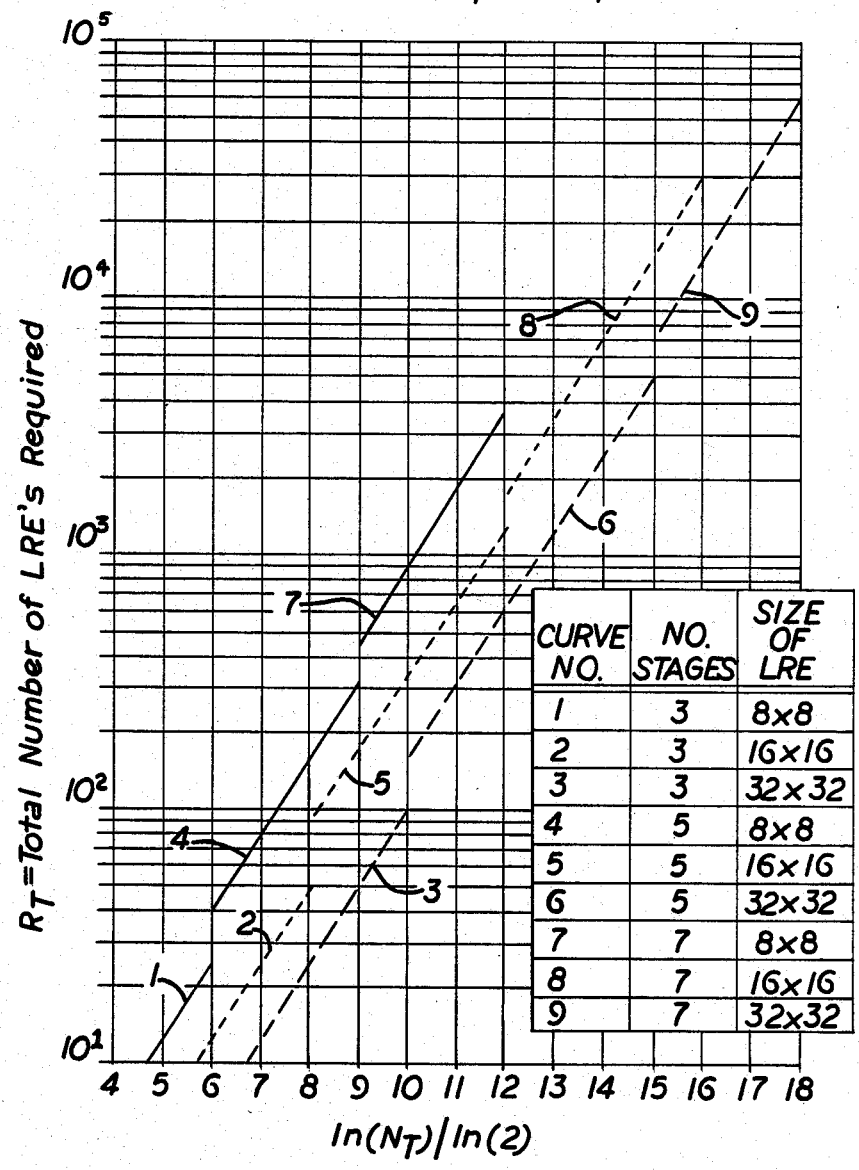
FIG. 2 shows the growth curves described by Equation (12)

The LRE's 11A(1)–(64) in the first stage are individually designated $LRE_L(1), LRE_L(2), \ldots, LRE_L(64)$, respectively, and the LRE's 11D(1)–(64) are individually designated $LRE_R(1), LRE_R(2), \ldots, LRE_R(64)$, respectively; see FIG. 1.

In the five stage embodiment of network 10 the second, third and fourth stages, B, C and D, respectively, taken together, comprise a set of modules 15 which are subordinate to stages A and E. In the third stage, C, the LRE's 11c constitute a series of inner modules 16 which are subordinate to and nested within modules 15.

As shown in FIG. 3, there are two conductors between each LRE in the first and fifth stages, A and E, respectively, and each next inner subordinate module 15 (i.e., $f_i = 2$). For example, the first two conductors 13 and 13' from LRE 11a(1) in the first stage A are to module 15(1); specifically conductor 13 is to LRE 11b(1) and conductor 13' is to LRE 11b(5).

Since there are two conductors 13 and 13' from each outer LRE 11a to each subordinate module 15 then there are 8 of these subordinate modules 15(1)–(8) required (i.e., $S_2 = 16/2 = 8$).

Modules 15(1)–(8), respectively, are individually designated as $M(2,1), M(2,2), M(2,3), \ldots, M(2,8)$; and, each module 15 is a fully available, three stage network; see FIG. 1.

The number of input/outputs to network 10 are distributed equally among the modules 15(1)–(8) so that each of these modules 15 receives 128 conductors 13 and 13' from the LRE's 11a in the first stage A (i.e., $N_2 = 2(64) = 128$).

Within each module 15, the LRE's 11b, 11c and 11d, in the second, third and fourth stages, respectively, each have 16 input conductors and 16 output conductors.

The total number of conductors received by each module 15 (i.e., $N_2$ 128) are distributed equally among the LRE's 11b and 11d in each module's outer stages (i.e., the second and fourth stages, B and D, respectively). Thus, eight LRE's 11b and 11d are required in both stages B and D of each module 14 (i.e., $R_2 = R_4 = 128/16 = 8$).

The second stage LRE's 11b in module 15(1) are individually designated as $LRE_L(1,1), LRE_L(2,1), \ldots, LRE_L(8,1)$ and the fourth stage LRE's 11d in module 15(1) are individually designated as $LRE_R(1,1), LRE_R(2,1), \ldots, LRE_R(8,1)$. This method of designating LRE's continues in a logical fashion so that the second stage LRE's 11b in module 15(8) are individually designated as $LRE_L(1,8), LRE_L(2,8), \ldots, LRE_R(8,8)$ and the fourth stage LRE's 11d in module 15(8) are individually designated as $LRE_R(1,8), LRE_R(2,8), \ldots, LRE_R(8,8)$; see FIG. 1.

Each LRE 11c within the center stage C is itself a module 15' and thus receives two conductors 14 and 14' from each of the LRE's in the outer stages B and D of its particular superordinate module 15. Thus, eight LRE's 11c(1)–(8) are required in the center stage of each module 15 (i.e., $S_3 = 16/2 = 8$).

The center stage LRE's 11c in module 15(1) are designated as $M(3,1,1), M(3,1,2), \ldots, M(3,1,8)$ and center stage LRE's 11c in module 15(2) are designated as $M(3,2,1), M(3,2,2), \ldots, M(3,2,8)$. This method of designating center stage LRE's 11c continues in a logical fashion so that center stage LRE's 11c in module 15(8) are designated as $M(3,8,1), M(3,8,2), \ldots, M(3,8,8)$.

The total number of LRE's 11 required to construct the compacted network 10 is 320, i.e., $R_T=((2)(64)+8(12\times 8)+8)=320$.

In comparison, a current state-of-the-art network having five stages and 1024 input/outputs would require 256 (16×16) LRE's and 256 (4×4) LRE's. Specifically, it would have 64 (16×16) LRE's in the first and fifth stages; it would have 16 modules at the second nesting level each with four (16×16) LRE's in the second and fourth stages; the third stage within each module would consist of 16 (4×4) elements.

As shown by the preceding specific examples, a state-of-the-art network with comparable network parameters (i.e., $N_T=1024$ and $\theta=5$) requires more LRE's than the network constructed in accordance with the present invention (i.e., 512 vs. 320). Furthermore, the present state-of-the-art networks require two types of LRE's (viz., (16×16) and (4×4)) whereas the networks in accordance with the present invention require only one type (viz., (16×16)). Furthermore, the redundant conductors and network compaction of the present invention significantly enhance the overall connectivity of the network. As such, the probability of having to rearrange existing connections in order to accommodate new ones is significantly reduced.

B. Network Control

Figure 4:
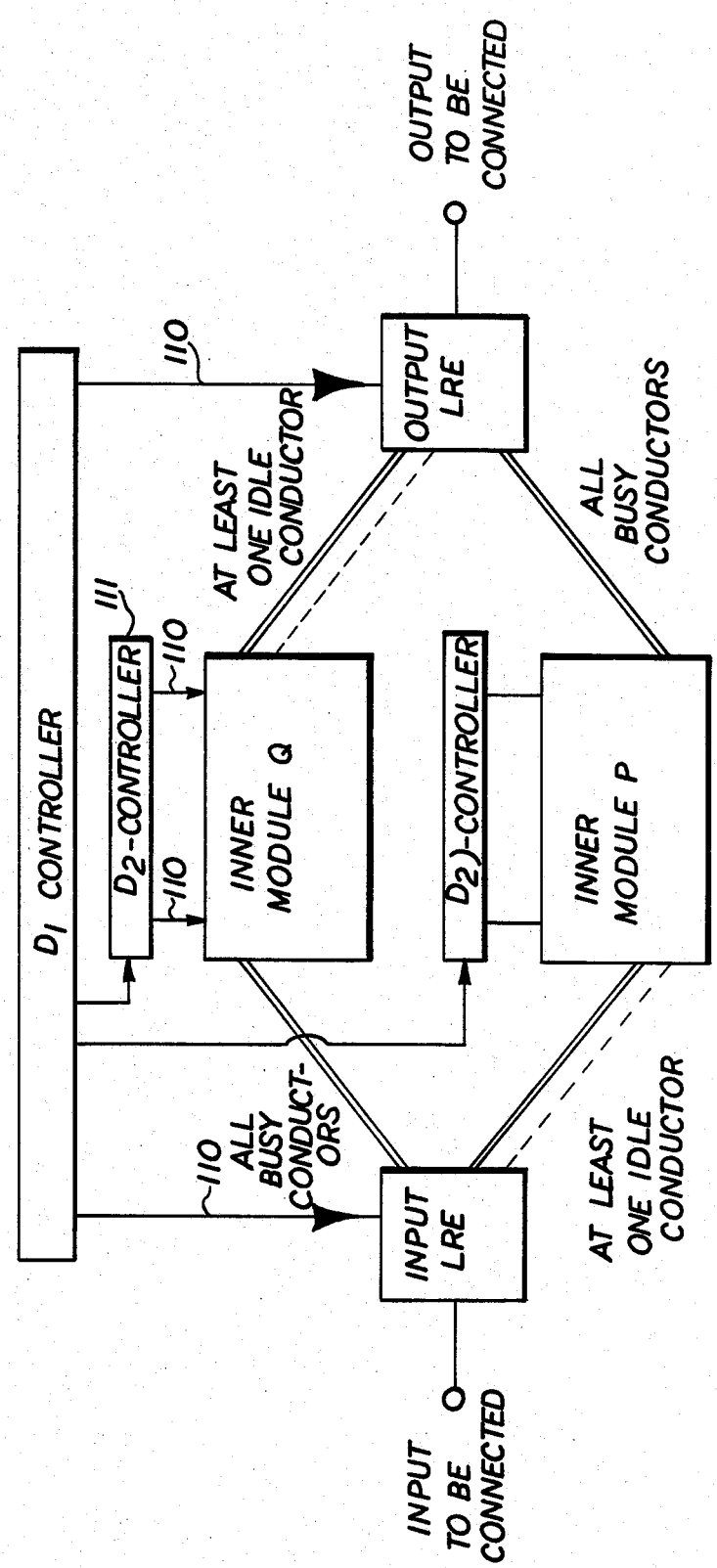
FIG. 4 is a general schematic of the control for networks of the present invention.

The inherent connectivity of network 10 due to the redundant conductors provided between stages significantly reduces the need for the rearrangement of paths of existing connections to satisfy a new connection demand. However, when rearrangement of the existing paths must take place, there are a number of possible rearrangement strategies which the network supports. Referring to FIGS. 3 and 4, a presently preferred control is referred to as the Inwardly Convergent Control (ICC).

According to the ICC methodology, a $\theta$-stage network is divided into 1 domains, where 1 is given by either Equation (1a) or (1b). For $i\leq 1$, $D_i$ designates the i-th control domain.

A control domain is comprised of LRE's in a pair of complementary stages of the network and therefore, for $i\leq 1$ when $\theta$ is odd, for $i\leq 1$ when $\theta$ is even, $D_i$ is the control domain for the i-th and $(\theta-i+1)$-th stages. If $\theta$ is odd, then the LRE's in the l-th stage, alone, constitute a control domain, viz., the $D_l$ domain.

For example, referring to FIG. 3, there are three control domains in the five stage network 10. The first control domain, referred to as $D_1$, controls the rearrangement of connections between a designated LRE 11a in the first stage of the network, and any of modules 15(1)-(8). The first control domain also controls the rearrangement of connections between any of modules 15(1)-(8) and a designated LRE 11d in the fifth stage of the network.

The second control domain, referred to as $D_2$, controls the rearrangement of connections between a designated LRE 11b in the second stage within a module 15 and the LRE's 11c in the third stage within the same module 15. The second control domain also controls the rearrangement of connections between a designated LRE 11c in the third stage of module 15 and the LRE's 11d of the fourth stage within the same module 15.

The third control domain, referred to as $D_3$, controls the rearrangement of paths within the center stage LRE's in module 15.

The ICC methodology rearranges paths starting from the outer stages of the network, moving inward in a symmetric fashion. Thus, for $i<1$, the $D_i$ control domain deals only with producing a viable path from designated i-th and $(\theta-i+1)$-th stage LRE's in superordinate module $M(i,k_2,k_3,\ldots,k_i)$ to its nested set of subordinate modules $M(i+1,k_2,k_3,\ldots,k_i,k_{i+1})$, where $1\leq k_{i+1}\leq S_{i+1}$. Implementing this path may require that existing connections be rearranged between members of the set of subordinate modules.

Within each affected module of the subordinate set of modules $M(i+1,k_2,k_3,\ldots,k_i,k_{i+1})$, where $1\leq k_{i+1}\leq S_{i+1}$, the prior connection problem is now in the $D_{i+1}$ control domain. This domain deals only with producing a viable path from the affected (i+1)-th and $(\theta-i)$-th stage LRE's in affected modules to their nested set of subordinate modules $M(i+2,k_2,k_3,\ldots,k_i,k_{i+1},k_{i+2})$, where $1\leq k_{i+2}\leq S_{i+2}$.

If $\theta$ is odd then, repeating this process l times, results in the rearrangement converging inwardly to the l-th stage (or to the l-th and (l+1)-th stages when $\theta$ is even) where it is finally completely solved in the $D_l$ control domain.

As the rearrangement problem converges inward between complementary pairs of stages of LRE's, there is a natural partitioning of the problem that takes place which permits the resulting disjoint parts to be solved concurrently. For example, in the $D_j$ control domain, a rearrangement of existing paths can be determined that demands a further rearrangement of existing paths of some subset of the $S_{j+1}$ subordinate modules. The rearrangements within each of these subordinate modules can be done concurrently since they are confined exclusively to within their own subordinate modules. Thus, in any j-th set of subordinate modules, there are $S_j$ controllers, one for each module in the set. Each such controller solely considers the rearrangement of paths between the $R_j$ LRE's in the input stage of the module and the $R_j$ LRE's in its output stage. Preferably, at the innermost control domains, the connection problem is so finely partitioned that one controler is able to efficiently serve multiple inner modules.

Relative to a given domain of control, a rearrangement is only required when no subordinate module has idle conductors between the input LRE and output LRE to which a connecting path is requested. As shown in FIG. 4, the network of the present invention, is such that when this is the case, there is always an inner module (P in FIG. 4) with at least one idle conductor to the requested input LRE. Similarly, there is always another inner module (Q in FIG. 4) with at least one idle conductor to the requested output LRE. A controller can always determine such a pair of inner modules by simply examining a status table that contains input LRE to output LRE link-use information. There is no need to be aware of how exactly the connections are satisfied through the inner modules, because except for the innermost control domains, each inner module will be serviced by its own controller.

The ICC methodology for rearrangement is the same for each stage of the network. It simply involves exchanging active connecting paths between inner modules (i.e., P and Q in FIG. 4) until one of these inner modules has idle conductors to both the requested input and output LRE's. When this is accomplished, control is then transferred to the next inner domain. If $\theta$ is odd, this is repeated until the i-th stage is reached or if $\theta$ is even until l-th and (l+1)-th stages are reached, at which point a complete set of rearranged paths through the network has been established and can be implemented.

In this regard, it is a feature of this invention that when rearrangement is required, the redundant conductors will generally increase the total number of available sequences for exchanging active connecting paths between modules.

Circuits utilizing microprocessors for controlling such rearrangements in accordance with the ICC described above are known to those skilled in the art.

C. Detecting, Isolating and Identifying Faulty Components

Normally, in rearrangeable, fully available networks, faulty paths remain concealed by the large number of alternate paths available for connecting an idle pair of terminals. Thus, if a fault exists, it must be isolated and identified for repair or replacement. Therefore, the networks of the present invention preferably includes a path verification system, and each LRE is provided with a bypass loop to facilitate such testing and fault finding.

The path verification system as implemented by the network's controllers is as follows:

(1) when an input-to-output connection is requested a path through the network is determined;
(2) a test signal from the input terminal is transmitted over the path to the output terminal;
(3) if the test signal is correctly received, the users are connected into the network;
(4) if the test signal fails to be received correctly at the output, another path through the switching network is determined and the identity of the LRE's comprising the faulty path are recorded for subsequent testing;
(5) the defective LRE is isolated and identified by transmitting a test signal over the faulty path and, one by one, shunting the test signal via each LRE's bypass loop.

D. LRE

Figure 5:
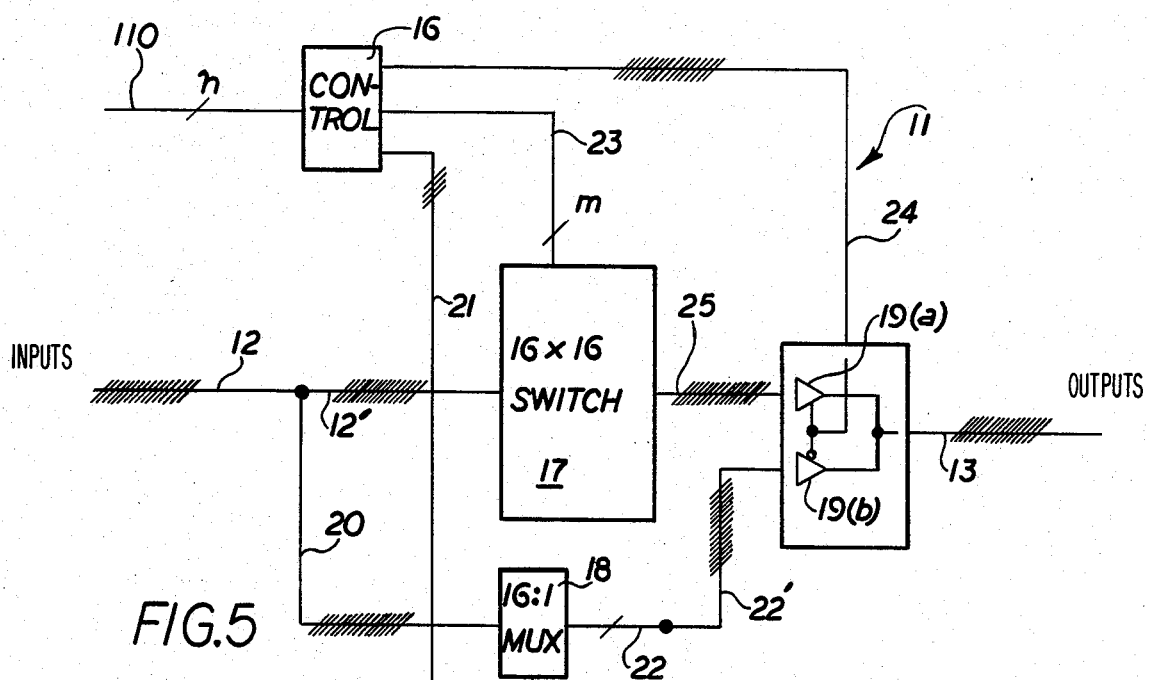
FIG. 5 is a general schematic of a (16×16) LRE.

With reference to FIG. 5, a general schematic of an LRE 11 is shown. LRE 11 comprises a control 16 connected to multiplexer 18 and to (16×16) switch 17 and a tri-state drivers 19 by means of conductors 21, 23 and 24, respectively.

The sixteen individual input conductors 12 are connected to the (16×16) switch 17 by conductors 12' and to multiplexer 18 by conductors 20. If LRE 11 is in the first stage of the network, then input conductors 12 are from outside network 10; if LRE 11 is not in the first stage, then input conductors 12 are from LRE's 11 in the preceding stages.

Conductors 13 are the output conductors for the LRE 11. Conductors 13 are connected to the (16×16) switch 17 via conductors 25 and tri-state driver 19(a). If LRE 11 is in the last stage of the network, then output conductors 13 are output from the network; if LRE 11 is not in the last stage, then output conductors 13 are to LRE's 11 in the next stage.

Conductors 20, 22 and 22', multiplexer 18 and tri-state driver 19(b) constitute the bypass loop which is used for detecting and isolating defective switch 17, described above.

Figure 6:
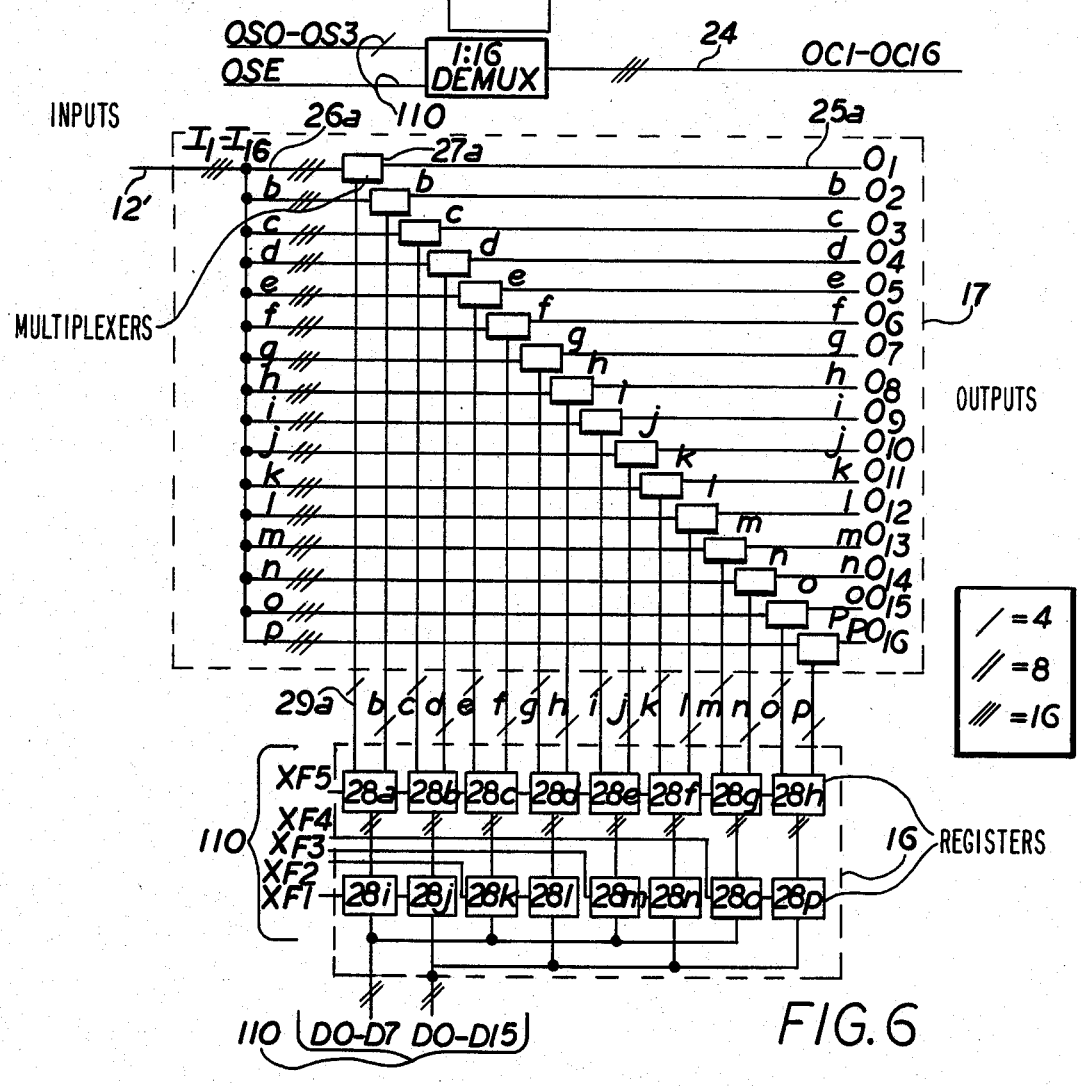
FIG. 6 is one specific circuit diagram for a PCB for a (16×16) LRE.

Referring to FIG. 6, a specific circuit diagram for a (16×16) LRE 11 is shown. In this embodiment, the (16×16) switch 17 is a strictly nonblocking network; however, it provides for rearrangement of the input or output according to the connection requirements of the next stage.

In this embodiment, the (16×16) switch 17 is composed of 16:1 multiplexers 27(a)-(p); each multiplexer 27 receives 16 conductors 26 which are connected to input conductors 12'. The output from each multiplexer 27 is a single conductor 25(a)-(p), which taken together comprise output 25 of the switch 17.

Control 16 is composed of octal registers 28(a)-(p). These registers 28 are connected to the multiplexers 27 by conductors 29(a)-(p). The control signals to controller 16 are received from the module controller 111 of FIG. 4 via conductors 110.

Figure 7:
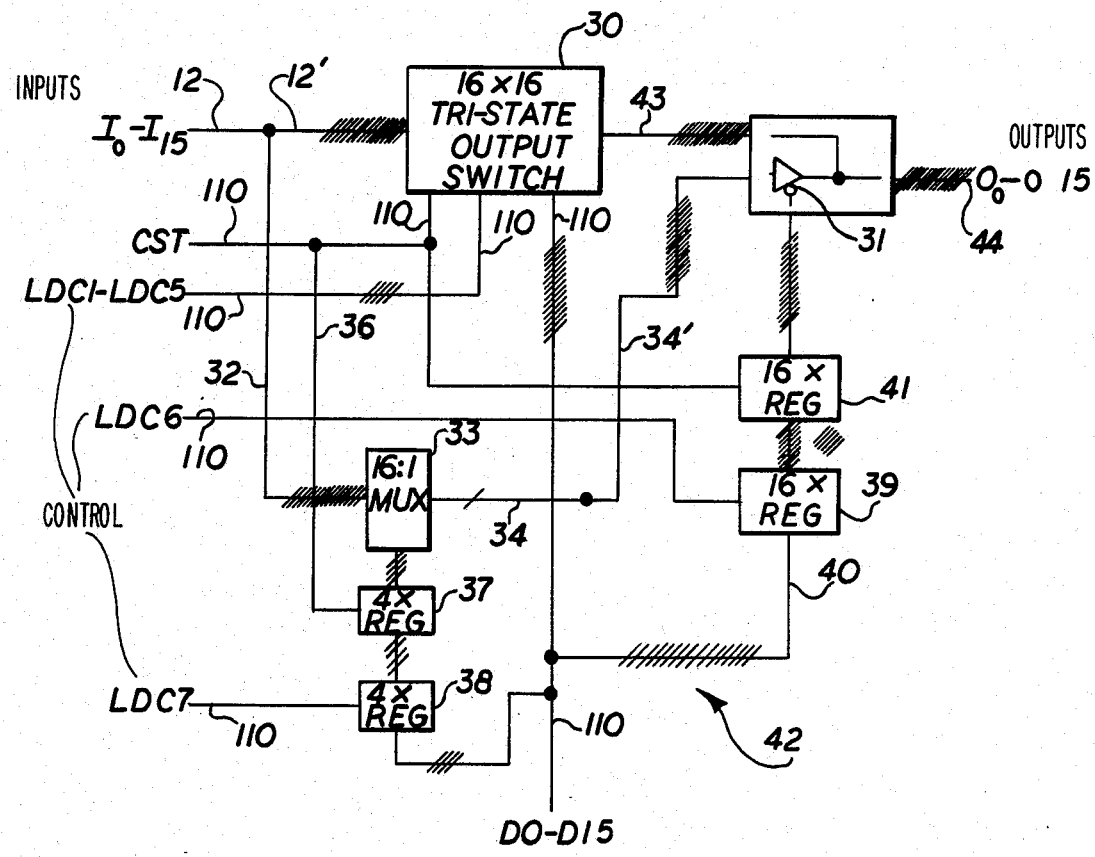
FIG. 7 is a general schematic of a (16×16) PCB which is to be combined with others to make a (32×32) LRE.

FIG. 7 depicts a general schematic of a (16×16) PCB 42 which would be combined with 3 others to form a (32×32) LRE 11. PCB 42 comprises a (16×16) tri-state output switch 30, a 16:1 multiplexer 33, two quad registers 37 and 38, and two 16 bits registers 39 and 41.

Input conductors 12 are connected to the tri-state switch 30 by conductors 12' and to multiplexer 33 by conductors 32. If the LRE 11 is in the first stage, then input conductors 12 are from outside the network; otherwise, input conductors 12 are from LRE's 11 in the preceding stage of the network.

Conductors 44 are the output conductors for PCB 42. Conductors 44 are either connected to another sister component PCB 42 in the LRE 11 or they are connected to an LRE 11 in the next outer stage.

Conductors 32, 34 and 34', multiplexer 33 and tri-state driver 31 constitute the bypass loop which was described previously; conductors 34' are a 1:16 fan-out of conductor 34.

Registers 37, 38, 39 and 41 are used to control the bypass loop; the control signals are received from the module controller 111 of FIG. 4 via conductors 110.

Figure 8:
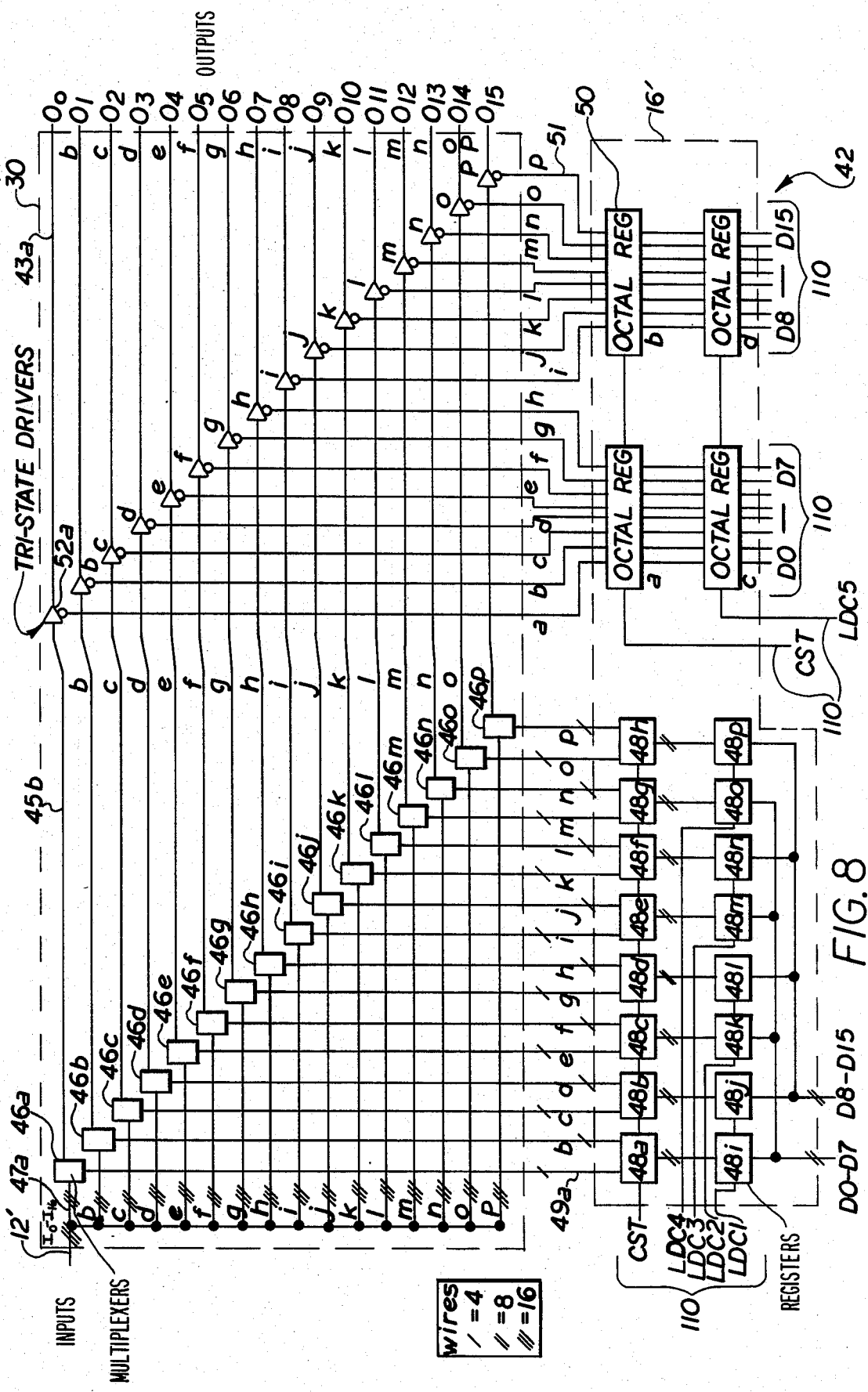
FIG. 8 is one specific circuit diagram for the (16×16) PCB of FIG. 7.

Referring to FIG. 8, a specific circuit diagram for PCB 42 is shown. In this embodiment, LRE 11 is composed of four PCB's 42 and is a strictly nonblocking network; however, it provides for rearrangement of the input or output according to the connection requirements of the next stage.

In this embodiment, the (16×16) PCB is composed of 16:1 multiplexers 46(a)-(p) and tri-state drivers 52(a)-(p).

Each multiplexer 46 receives 16 conductors 47 which are connected to input conductors 12'. Each multiplexer 46 is connected by a single conductor 45 to a tri-state driver 52. The output from each tri-state driver 52 is a single conductor 43(a)-(p) when, taken together comprise the output 43 of the (16×16) switch 30.

Control 16' is composed of octal registers 48(a)-(p) and octal registers 50(a)-(d). Octal registers 48 are connected to multiplexers 46 by conductors 49(a)-(p); octal registers 50 are connected to tri-state drivers 52 by conductors 51(a)-(p).

The control signals to controller 16' are received from the module controller 111 of FIG. 4 via conductors 110.

Figure 9:
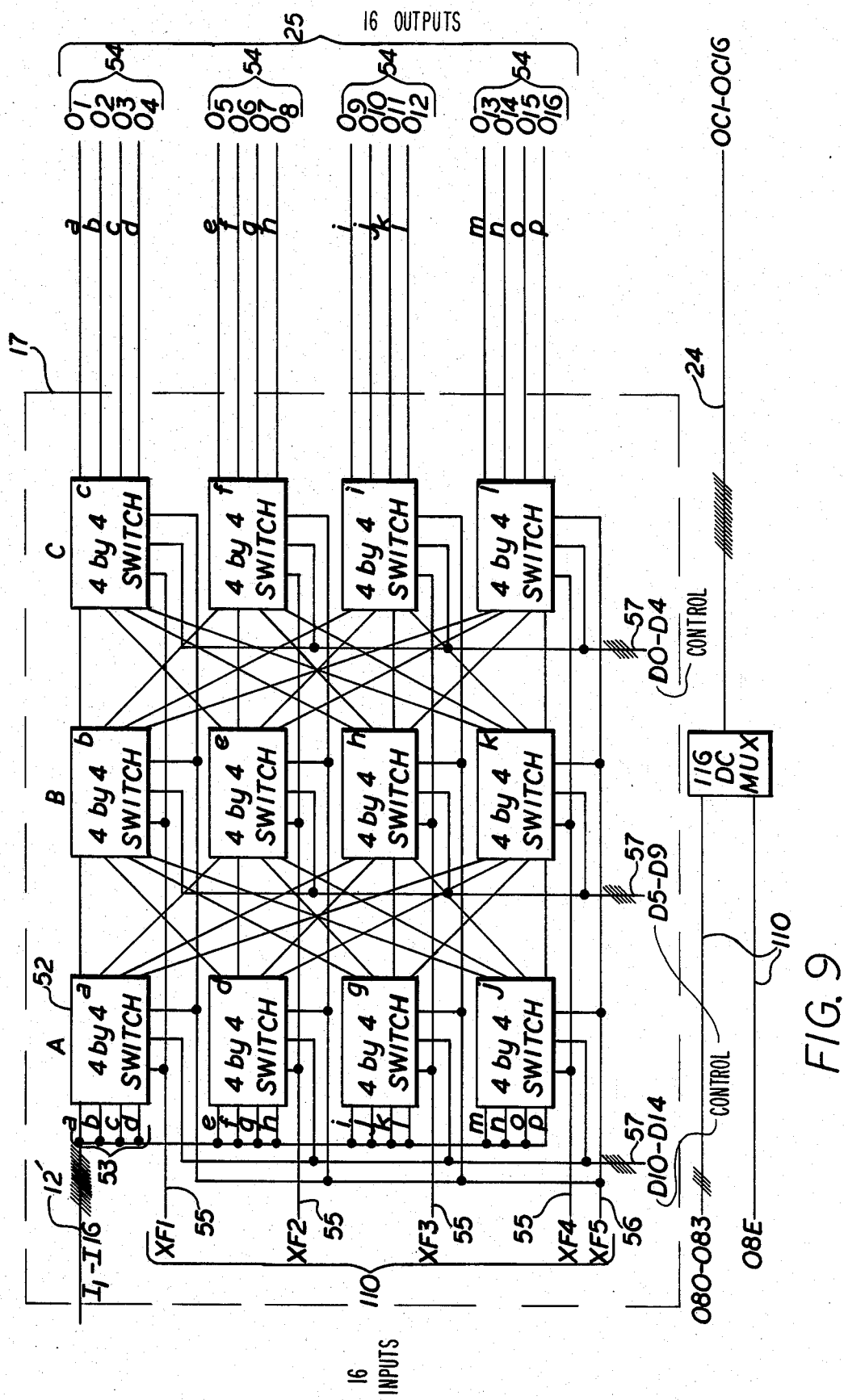
FIG. 9 is a general schematic of a (16×16) LRE comprised of a three stage, rearrangeable network of (4×4) switch elements.

FIG. 9 is a schematic of a second embodiment of the (16×16) switch 17 of FIG. 5. In this embodiment, the (16×16) switch 17 is a three stage, fully available network composed of twelve (4×4) sub-elements 17'(a)-(l).

The input conductors 12' are distributed equally between the four switches 17'(a), (d), (g) and (j) of the first stage A. Thus, each switch 17' in the first stage A receives four input conductors 53. Similarly, each switch 17' in the second and third stages, (i.e., B and C, respectively) receives four input conductors.

Pursuant to the logic of rearrangeable, fully available networks, each switch 17' has four outputs 54; the four sets of these outputs (i.e., 54(a)–(p)), taken together, constitute the output 25 of the (16×16) network 17.

The (16×16) network 17 obtains its control signals from the module controller 111 of FIG. 4 via conductors 110. The appropriate sets of these control signals are passed to each switch element 17' via conductors 55, 56 and 57.

Figure 10:
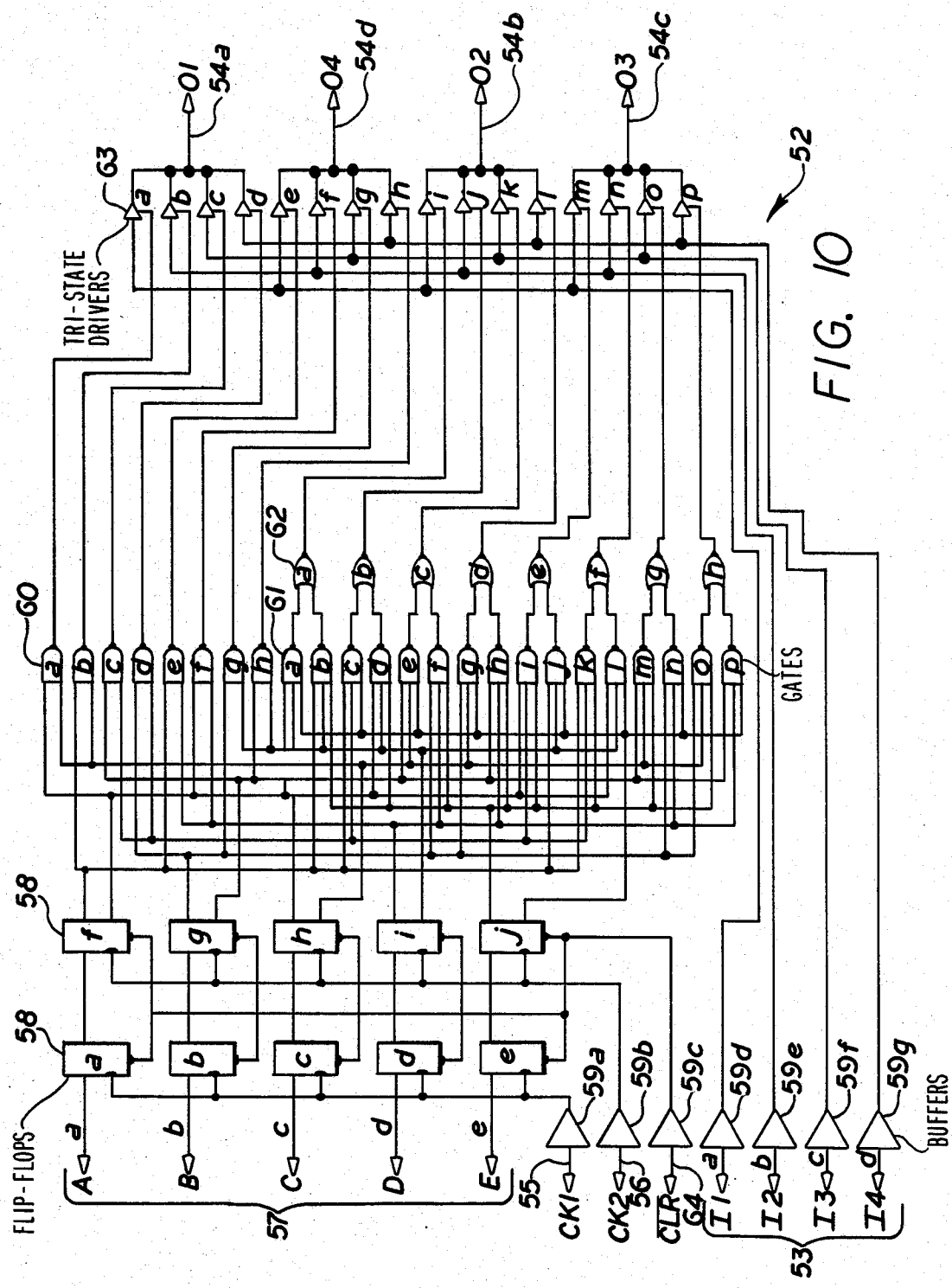
FIG. 10 is one specific circuit diagram for the (4×4) switch element of the LRE shown in FIG. 9.

FIG. 10 is a circuit diagram for the (4×4) switch element 17' of FIG. 9. In this embodiment, the switch element consists of D-type flip-flops 58(a)–(j), buffers 59(a)–(g), two-input NAND gates 60(a)–(h), three-input NAND gates 61(a)–(p), two-input AND gates 62(a)–(h) and tri-state drivers 63(a)–(p).

The four input terminals 53(a)–(d) are connected to buffers 59(d)–(g), respectively; these input terminals are four components of the LRE overall input 12' of FIG. 9.

Control signals are received by switch element 17' at terminals 55, 56, 64 and 57(a)–(e); these terminals are components of the LRE overall control input 110 of FIG. 9; the control signals are obtained from the module controller 111 of FIG. 4.

As shown in FIG. 10, the control signal received at terminal 64 is impressed on buffer 59(c), which initializes D-type flip-flops 58(a)–(j). D-type flip-flops 58 control the two-input NAND gates 60(a)–(h) and the three-input NAND gates 61(a)–(p). The control signal received at terminal 55 is impressed on buffer 59(a) and loads D-type flip-flops 58(a)–(e) with the signal obtained at terminals 57(a)–(e). Similarly, the control signal received at terminal 56 loads buffer 59(b) which, in turn, loads D-type flip-flops 58(f)–(j) with the signals in flip-flops 58(a)–(e). The control signal received at terminal 64 loads buffer 59(c) and is passed to all D-type flip-flops 58.

The output signals from NAND gates 60(a)–(h) are directed to tri-state drivers 63(a)–(h), respectively, which provide the signals to output terminals 54(a) and 54(d). Output terminal 54(a) is connected to tri-state drivers 63(a)–(d) and output terminal 54(d) is connected to tri-state drivers 63(e)–(h).

The signals from successive pairs of three-input NAND gates 61(a)–(p) (e.g., 61(a), (b); 61(c), (d); etc.) are directed to two-input AND gates 62(a)–(h), respectively, and, in turn, are passed to tri-state drivers 63(i)–(p).

Tri-state drivers 63(i)–(l) are connected to output terminal 54(b) and tri-state drivers 63(m)–(p) are connected to output terminal 54(c).

The output terminals 54(a)–(d) of switch element 17' are four components of the LRE overall output 25 shown in FIG. 9.

E. Transposed Assignments and Their Symmetric Realization

In switching networks, assignments of inputs to outputs often take on a dual form in the sense that if a connection is required between particular, input $1_p$ and particular output $O_v$ from the network, where $1 \leq p \leq N_T$ and $1 \leq v \leq N_T$, and if $p \neq v$, then a corresponding connection is required between input $1_v$ and output $O_p$. In such a case, any request for a connection is actually a pair of requests. Since, in any such dual request, the indices of the requested connections are transposed, assignments of this type are referred to as transposed assignments.

Transposed assignments require that the number of input/output terminals $N_T$ be even since otherwise a complete set of dual requests involving all $N_T$ inputs and $N_T$ outputs cannot be specified.

Let $i_s(j)$ designate a particular input to an LRE in the j-th stage of the network and let $o_t(j)$ designate a particular output from an LRE in the j-th stage where $1 \leq s \leq K_j$ and $1 \leq t \leq K_j$.

Two LRE's in the complementary stages of the network are said to be in transposed states if, for all values of t and s, the LRE in the j-th stage connects $i_s(j)$ to $o_t(j)$ and the LRE in the $(\theta-j+1)$-th stage connects $i_t(\theta-j+1)$ to $o_s(\theta-j+1)$.

In $\theta$-stage networks of the present invention, where $\theta$ is even and where $K_1, K_2, \ldots, K_l$ are all even, transposed assignments can be realized symmetrically relative to mirror-image LRE's in the sense that, for the realization, mirror-image LRE's can be placed in transposed states. A realization of an assignment which has all mirror-image LRE's in transposed states is referred to as a symmetric realization.

To achieve symmetric realizations of all transposed assignments in networks where $\theta$ is even requires that the LRE's in the l-th stage be linked in a particular way to the LRE's in the (l+1)-th stage and that the linkage need not necessarily be between mirror-image LRE's. Such linking patterns will be referred to as caross-couplings.

Depending on the nature of the conductor-redundancy parameters, $f_1, f_2, \ldots, f_{l-1}$, two cross-coupling patters are employed in the present invention. Specifically, when, for $1 \leq t \leq K_l$, each $o_t(l)$ is linked to each $i_t(l+1)$, then the cross-coupling is said to have an identity pattern. On the other hand, the cross-coupling is said to have a switched pattern where $o_t(l)$ is linked to $i_{(t+1)}(l+1)$, for t odd, and when $o_t(l)$ is linked to $i_{(t-1)}(l+1)$, for t even.

If, for all values of $1 \leq j \leq (l-1)$, $f_j > 1$, then the pair of mirror-image LRE's comprising each $M(l, k_2, k_3, \ldots, k_l)$ module are cross-coupled according to the switched linking pattern.

If, for some value of j, $f_j - 1$ and for any $1 \leq i \leq (j-1)$, $f_i > 1$, then $c = j+1$ is the index of module-group across which cross-coupling must occur if the symmetric realization of all network assignments are to be achieved. In this case $LRE_L(1, k_2, k_3, \ldots, k_c = a, \ldots, k_l)$ is cross-coupled to $LRE_R(1, k_2, k_3, \ldots, k_c = b, \ldots, k_l)$ using the identity linking pattern and, likewise, $LRE_L(1, k_2, k_3, \ldots, k_c = b, \ldots, k_l)$ is cross-coupled to $LRE_R(1, k_2, k_3, \ldots, k_c = a, \ldots, k_l)$, where (a,b) designates the ordered pairs $(1,2),(3,4), \ldots, (S_{c-1}, S_c)$.

Figure 11A:
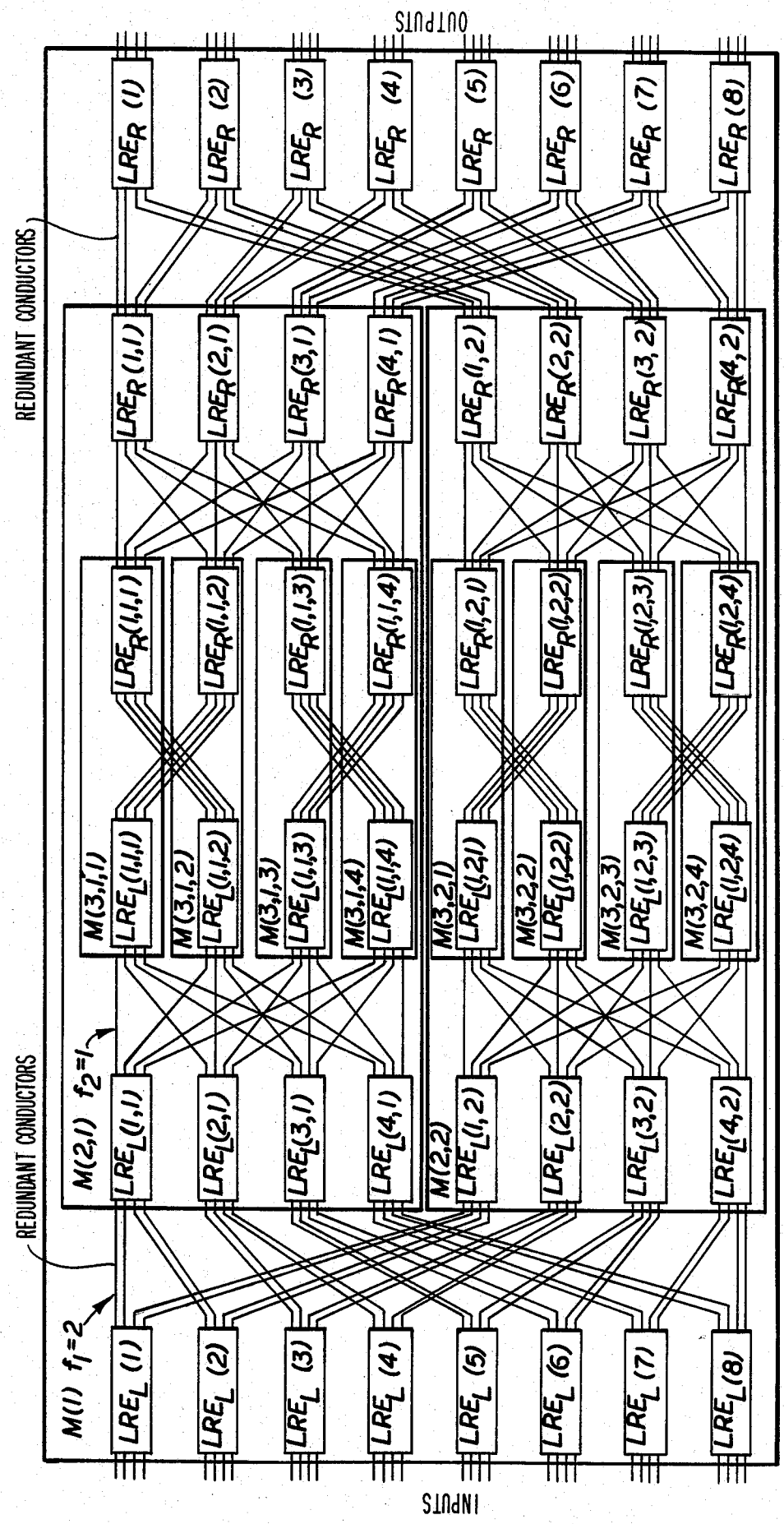
FIGS. 11a and 11b illustrate the cross-coupling in two implementations of a (32×32) six stage network.
Figure 11B:
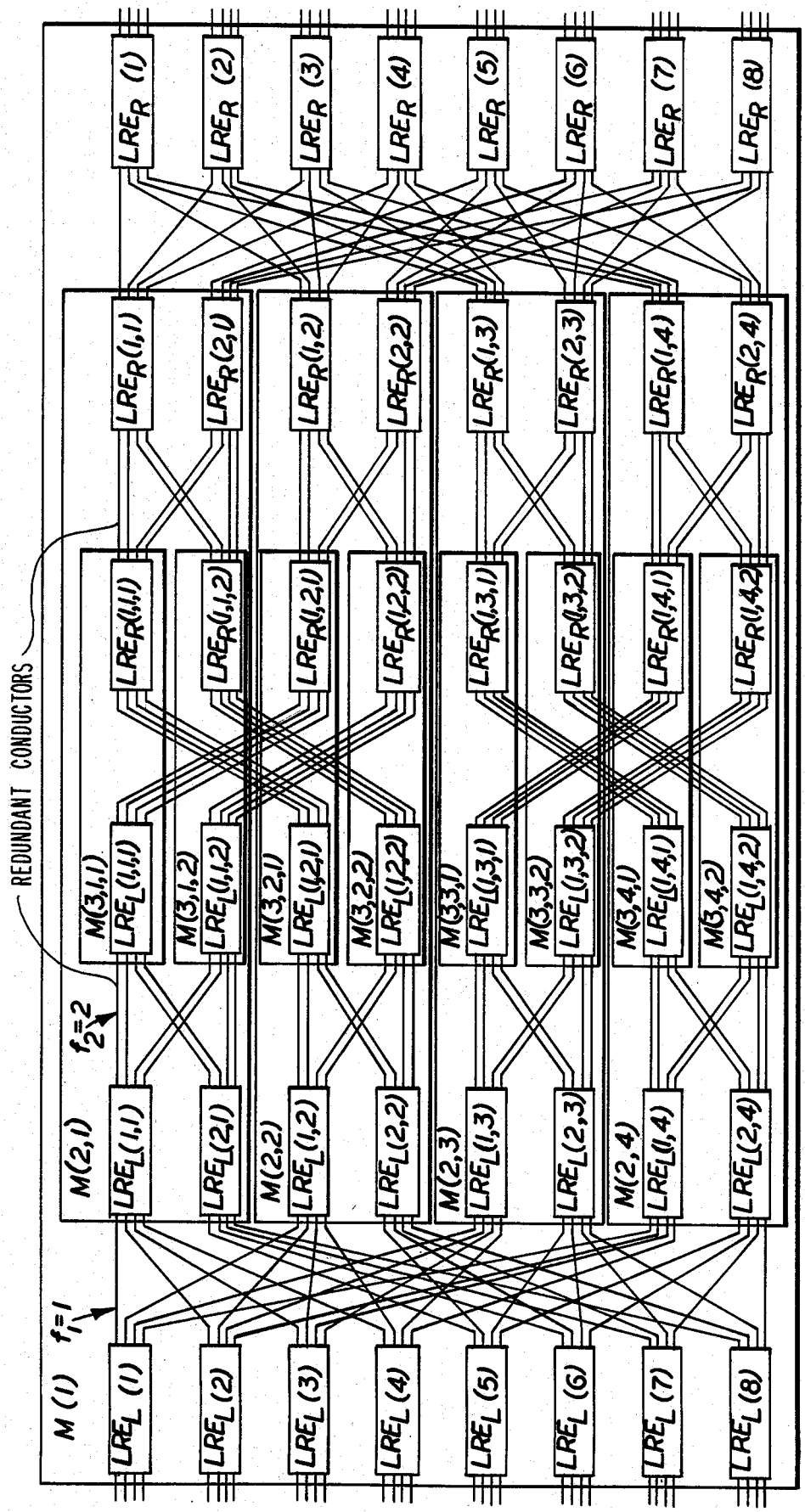

As an example of the cross-coupling described above, FIGS. 11a and 11b show two implementations of a (32×32) network in 6 stages. In each network $K_i = 4$, $i = 1, \ldots, 6$. In FIG. 11a, $f_1 = 2$ and $f_2 = 1$. Hence, the cross-coupling is the identity linking pattern between $LRE_L(1, k_2, a)$ and $LRE_R(1, k_2, b)$, and between $LRE_L(1, k_2, b)$ and $LRE_R(1, k_2, a)$, for $k_2 = 1$, 2 and $(a,b) = (1,2),(3,4)$. In FIG. 11b, $f_1 = 1$ and $f_2 = 2$. Hence, the cross-coupling is the identity linking pattern between $LRE_L(1, a, k_3)$ and $LRE_R(1, b, k_3)$, and between $LRE_L(1, b, k_3)$ and $LRE_R(1, a, k_3)$ for $k_3 = 1$, 2 and $(a,b) = (1,2),(3,4)$.

In the present invention $\theta$-stage networks with cross-coupling, as described above, are fully available in that any assignment of inputs to outputs can be realized. To demonstrate the full availability, consider a fully available $(\theta-1)$-stage network (i.e., a network with an odd number of stages) which can be transformed into a $\theta$-stage network (i.e., a network with an even number of stages) by adding a new stage between the l-th and the (l+1)-th stages by cutting the links between the l-th and the (l+1)-th stages and inserting $R_l$ LRE's; setting the linking between the LRE's of this new stage and the LRE's in (what was previously) the (l+1)-th stage to be a replica of that between the LRE's in (what were previously) the l-th and (l+1)-th stages; and setting the linking between LRE's between the l-th stage and the new stage to correspond to the cross-coupling described above. Because all LRE's have full connectivity between their $K_l$ inputs and $K_l$ outputs, it is clear that for such cross-coupling, the addition of a new stage in this manner does not affect the full connectivity of the original network.

Moreover, a $\theta$-stage network with cross-coupling, as described above, can symmetrically realize all transposed assignments. To demonstrate this, consider any such network and one dual request to be realized through it. Suppose without any loss of generality, that one of the requested pair of requests involves input $i_x, 1 \leq i_x \leq K_1$, on $LRE_L(i_1)$, $1 \leq i_1 \leq R_1$ and output $o_y$, $1 \leq o_y \leq K_1$ on $LRE_R(i_\theta)$, $1 \leq i \leq R_1$. Any path can be chosen to satisfy this request. It should be noted that establishing a second path by setting the mirror-image LRE of each LRE in the other path into the transposed state results in a path from input $i_y$ on $LRE_R(i_\theta)$ to output $o_x$ on $LRE_R(i_1)$. In other words, this second path satisfies the other request in the original dual request. These two paths will be referred to as dual paths. Hence, symmetric realization in a $\theta$-stage network with cross-coupling as described above is assured via dual paths for a single dual request. Assume this is true for any w dual requests, $1 \leq w \leq (N_T/2)$; that is, the symmetric realization via dual paths are assured for any w or fewer dual requests. To show then that this is ture for any w+1 dual requests, it will suffice to assume otherwise and see that this leads to a contradiction. Accordingly, assume that there is a set of w dual requests that can be symmetrically realized via dual paths through the network, but assume this realization places the network into a state in which an additional dual request cannot also be symmetrically realized. Let Request 1 denote one of the requested connections in the dual request as a required path from input $i_y$, $1 \leq i_y \leq K_1$, on the $LRE_L(i_j)$, $1 \leq i_j \leq R_1$, to output $o_x$, $1 \leq o_x \leq K_1$, on $LRE_R(i_q)$, $1 \leq i_q \leq R_1$; let Request 2 denote the other requested connection in this dual request. By assumption for the given state of the network, any additional path through the network satisfying Request 1 is such that its dual cannot be used to satisfy Request 2. Likewise, any additional path through the network satisfying Request 2 is such that its dual cannot be used to satisfy Request 1. But therein lies a contradiction: for if the network is satisfyng w dual requests via w dual paths and additionally Request 1 can be satisfied by some path but the dual of this path is not available to satisfy Request 2, must be that one of w dual paths is using a segment of this dual path. But the dual of this segment must also be used which means that the path used to satisfy Request 1 could not have been available to begin with. Hence a $\theta$-stage network with cross-coupling as described above can symmetrically realize all transposed assignments.

A significant enhancement to network connectivity is provided by redundant linkage. For example, in a network where $f_k=1$ and $f_i>1$, $1 \leq i \leq k \leq (l-1)$, the cross-coupling between left-side and right-side LRE's in the l-th module grouping is such that if a given path from a network input to some network output goes through module $M(k+1, j_2, \ldots, j_k, j_{k+1})$ where $j_{k+1}$ is odd and $1 \leq j_{k+1} \leq S_k - 1$ then the dual of this path goes through $M(k+1, j_2, \ldots, j_k, j_{k+1}, +1)$. Hence, the single conductors between LRE's in the k-th stage and the $M(k+1, j_2, \ldots, j_{k+1})$'s require that *two* of the $M(k+1, j_2, \ldots, j_{k+1})$'s be used to provide a dual path. In contrast if $f_k > 2$, then only one $M(k+1, j_2, \ldots, j_{k+1})$ would be needed to provide such dual paths. In other words, the availability of dual paths for symmetric realizations of transposed assignments is greater than redundant linkage is used in the network.

F. Dual LRE

In accordance with the present invention, it is possible to provide a dual LRE-common control switching element which takes advantage of the network property that mirror-image LRE's can be set to transposed states so as to realize transposed assignments. Such a dual element consists of 2 (K×K)-networks and common control logic. The same set of control signals which sets one of the (K×K)-networks into a specified state can, with only slight modification, be used to set the mirror-image of that (K×K)-network into the transposed state.

Figure 12A:
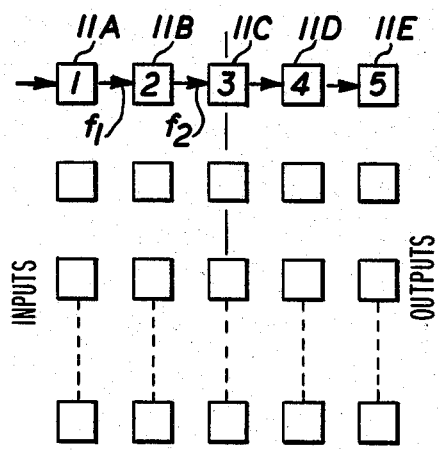
FIGS. 12a-12c illustrates the implementation of dual elements in a five stage symmetrical network.

FIG. 12 illustrates the implementation of dual elements in a five stage network. In this example, FIG. 12a illustrates a normal five stage network with LRE's 11A comprising the first stage, 11B comprising the second stage, etc., and with a line of symmetry passing through the third stage; in this example, the signals, shown as arrows, pass from left to right.

In FIG. 12a, the first and fifth stages are complementary stages and LRE's 11A and 11E are mirror-image LRE's. Similarly, the second and fourth stages are complementary stages and LRE's 11B and 11D are mirror-image LRE's.

Figure 12B:
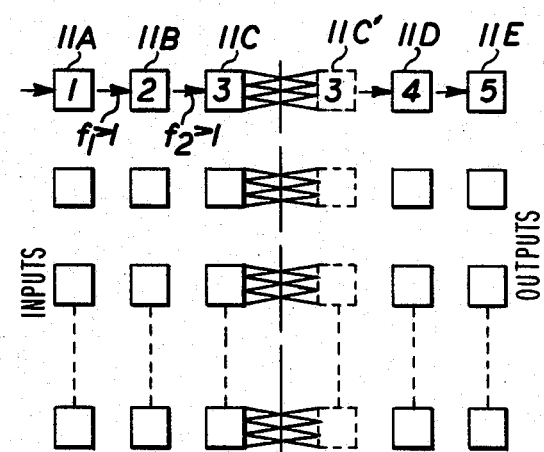

By using dual elements, one effectively adds another stage to the network, shown as stage 3' in FIG. 12b, thus shifting the line of symmetry. In FIG. 12b, stages 3 and 3' are complementary stages and LRE's 11c and 11c' are mirror-image LRE's. For simplicity, it is assumed in FIG. 12, that $f_1 > 1$ and $f_2 > 1$ and therefore, a switched cross-coupling pattern is shown.

Figure 12C:
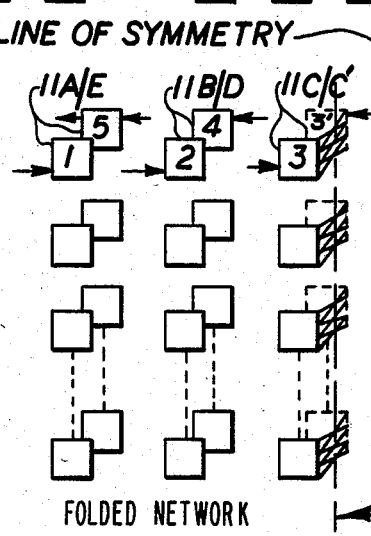

Since mirror-image LRE's in stages 1 and 5, 2 and 4 and 3 and 3' share much of the same control logic and circuitry, they are combined into dual switching elements. As illustrated in FIG. 12c, this is equivalent to folding the network along the new line of symmetry with the daul elements depicted as 11A/E, 11B/D and 11C/C'. As shown in this example, the network constructed with the dual elements requires only 3/5 of the quantity of control hardware required by the five stage network of FIG. 12a. This network, therefore, has $N_T$ combined input/output ports. In general, if $\theta$ is odd, then the comparable fraction would be $1/\theta$, and if $\theta$ is even, the fraction would be ½.

FIG. 13 is a specific circuit diagram of a (4×4) switch element 17' for LRE 17 of FIG. 8 when that type LRE is a dual element. Thus, the circuit diagram of FIG. 13 is the dual-element equivalent of the circuit diagram shown in FIG. 10.

In a dual element embodiment, the (4×4) switch element 17' consists of D-type flip-flops 158(a)-(j), buffers 159(a)-(k), two-input NAND gates 160(a)-(h), three-input NAND gates 161(a)-(p), two-input AND gates 162(a)-(h) and tri-state drivers 163(a)-(ff).

The input terminals 153(a)-(h) are connected to buffers 159(d)-(k), respectively, these input terminals are components of the LRE overall input 12' of FIG. 9.

Four of the eight input terminals (e.g., 153(a)-(d)) are part of LRE 11A/E(1) of FIG. 10c while the other four input terminals (e.g., 153(e)-(h)) are part of LRE A/E(5) of FIG. 10c.

Control signals are received by switch element 17' at terminals 155, 156, 164 and 157(a)-(e). These terminals are components of the LRE overall control input 110 of FIG. 9. The control signals are obtained from the module controller 111 of FIG. 4.

As shown in FIG. 12, the control signal received at terminal 164 is impressed on buffer 159(c) and passes to D-type flip-flops 158(a)-(j). D-type flip-flops 158 control the two-input NAND gates 160(a)-(h) and the three-input NAND gates 161(a)-(p). The control signal received at terminal 155 is impressed on buffer 159(a) and passes to D-type flip-flops 158(a)-(e); similarly, the control signal received at terminal 156 loads buffers 159(b) and passes to D-type flip-flops 158(f)-(j). The control signal received at terminal 164, loads buffers 159(c) and passes to all D-type flip-flops 158.

The output signals from NAND gates 160(a)-(d) are directed to tri-state driver pairs 163(a) and (g), 163(b) and (u), 163(c) and (y) and 163(d) and (cc), respectively. The output signals from NAND gates 160(e)-(h) are directed to tri-state driver pairs 163(m) and (t), 163(n) and (x), 163(o) and (bb) and 163(p) and (ff).

The signals from successive pairs of three-input NAND gates 161(a)-(p) (e.g., 161(a), (b); 161(c), (d); etc.) are directed to two-input AND gates 162(a)-(h), respectively.

The signals from two-input AND gates 162(a)-(h) are directed to tri-state driver pairs 163(e) and (r), 163(f) and (v), 163(g) and (z), 163(h) and (dd), 163(i) and (s), 163(j) and (w), 163(k) and (aa) and 163(l) and (ee) respectively.

Tri-state drivers 163(a)-(d) are connected to output terminal 154(a), drivers 163(e)-(h) to 154(b), drivers 163(i)-(l) to terminal 154(c), drivers 163(m)-(p) to terminal 154(d), drivers 163(q)-(t) to terminal 154(e), drivers 163(u)-(x) to terminal 154(f), drivers 163(y)-(bb) to terminal 154(g) and driver 163(cc) to terminal 154(h).

Input signals received on terminals 153(a)-(d) are passed to any of output terminals 154(a)-(d) and the input signals received on terminals 153(e)-(h) are passed to any of output terminal 154(e)-(h). The output terminals 154(a)-(h) of switch element 17' are components of the LRE overall output 25 of FIG. 9. Four of the eight output terminals (e.g., 154(a)-(d)) are part of LRE 11A-/E(1) of FIG. 11(c) while the other four output terminals (e.g., 154(e)-(h)) are part of LRE A/E(5) of FIG. 11(c).

While the presently preferred embodiments of the invention have been shown and described in particularity, the invention may be otherwise embodied within the scope of the appended claims.

What is claimed is:

1. A rearrangeable fully available multistage switching network having $N_T$ inputs and $M_T$ outputs comprising a plurality of switching elements arranged in a columnar array of $\theta$ stages, where $\theta \geq 3$, inner columns defining at least one nested module where each of said switching elements in one stage is connected to an associated switching element in the next adjacent stage of an inner module such that at least one set, $f_i$, of said connections between stages is redundant, such that $f_i > 1$, thereby reducing the need for or extent of the rearrangements when establishing connections through said switching network.

2. A rearrangeable fully available multistage switching network as set forth in claim 1 for the realization of transposed assignments wherein $M_T = N_T$ and $\theta$ is even and the switches within the l-th and (l+1)-th stages, where $l = \theta/1$, are cross-coupled such that transposed assignments are symmetrically realized.

3. A rearrangeable fully available multistage switching network as set forth in claim 1 or 2, wherein each switching element, LRE, is comprised of one or more identical printed circuit boards.

4. A rearrangeable fully available multistage switching network as set forth in claim 1 or 2, wherein each switch within every stage is the same size.

5. Printed circuit boards as set forth in claim 3, wherein a bypass loop is provided to facilitate testing of each said printed circuit boards.

6. A switching network as set forth in claim 3 comprising printed circuit boards, each having a bypass loop; said network having a controller having means for
   (a) transmitting a test signal from the input terminal over a network to an output terminal;
   (b) connecting the terminals through said path if said test signal is correctly received;
   (c) connecting through another path if the test signal is incorrectly received and recording the identity of said faulty path for subsequent testing; and
   (d) transmitting a test signal over the faulty path, and one by one, shunting the test signal via each LRE's bypass loop, to isolate and identify the defective LRE.

7. A rearrangeable fully available multistage switching network as set forth in claim 1 for the realization of transposed assignments in folded or unfolded form wherein $M_T = N_T$ and $\theta$ is even for switches with the I-th and (I+1)-th stages, where $I = \theta/2$, are cross-coupled such that transposed assignments are symmetrically realized.

8. A rearrangeable fully available multistage switching network as set forth in claim 1 for the realization of transposed assignments in folded form using dual LRE's, wherein $M_T = N_T$ and $\theta$ is even and the switches within the I-th and (I+1)-th stages, where $I = \theta/2$, are cross-coupled such that transposed assignments are symmetrically realized.

9. A rearrangeable fully available multistage switching network as set forth in claim 1, 2, 7 or 8 wherein said switches in an outer stage are connected to all associated subordinate inner modules.

10. A rearrangeable fully available multistage switching network as set forth in claim 1, 2, 7 or 8 wherein each switch in said network comprises a strictly nonblocking switching element.

11. A rearrangeable fully available multistage switching network as set forth in claim 1, 2, 7 or 8 wherein $M_T = N_T$ and the total number $R_T$ of switching elements is equal to $$R_T = 2 \cdot \left[ \frac{N_T}{K_1} \right] + 2 \cdot$$

$$\sum_{i=2}^{\psi} \left[ \left[ \cdots \left[ \left[ \frac{N_T}{K_1} \right] \frac{1}{K_2} \right] \cdots \right] \frac{1}{K_i} \right] \cdot \prod_{j=1}^{(i-1)} K_j +$$

$$\xi \left[ \left[ \cdots \left[ \left[ \frac{N_T}{K_1} \right] \frac{1}{K_2} \right] \cdots \right] \frac{1}{K_I} \right] \cdot \prod_{j=1}^{(I-1)} K_j$$

j = module-group comprised of switches in stages j to ($\theta$−j+1) for j≦l;

i = any stage in the network such that i=1,2 ...,$\theta$;

$R_i$ = the number of switches comprising the i-th stage contained within each module-group j=i;

$l = (\theta + 1)/2$, when $\theta$ is odd; and $= \theta/2$, when $\theta$ is even;

$\Psi = l - 1$, when $\theta$ is odd; and $= l$ when $\theta$ is even;

$\xi = 1$, when $\theta$ is odd; and $= 0$, when $\theta$ is even; and $K_i$ = size of switch in the i-th stage.

12. A rearrangeable fully available multistage switching network as set forth in claim 11, wherein $N_T$, K, and $f_i$, for $1 \leq i < l$ have values such that $$MOD(N_T, K^{(l-1)}) = 0$$

and $$K^{(l-1)} \leq N_T \cdot \prod_{i=1}^{(l-1)} f_i \leq K^l,$$

wherein the number of LRE's comprising said network is directly proportional to $N_T$ such that $$R_T = \theta \cdot N_T / K,$$

where said LRE is the least reducible element in the network.

* * * * *

UNITED STATES PATENT AND TRADEMARK OFFICE
CERTIFICATE OF CORRECTION

PATENT NO. : 4,654,842

DATED : March 31, 1987

INVENTOR(S) : Giorgio L. Coraluppi, et al

It is certified that error appears in the above-indentified patent and that said Letters Patent is hereby corrected as shown below:

In column 3, line 15, the numeral "1" after the mathematical expression "$i=1,2,3,\ldots\theta.$" should be the letter --I--.

In column 3, line 18, the equation "$1=(\theta+1)/2$" should be --$I=(\theta+1)/2$--.

In column 3, line 22, the equation "$1=\theta/2$" should be --$I=\theta/2$--.

In column 3, line 31, the term "1-th" should be --I-th--.

In column 3, line 31, the term "(1+1)-th" should be --(I+1)-th--.

In column 3, line 32, the mathematical expression "$i<1$" should be --$i<I$--.

In column 3, line 32, the mathematical expression "$i\leq 1$" should be --$i\leq I$--.

In column 3, line 45, the mathematical expression "$j\leq 1$" should be --$j\leq I$--.

In column 3, line 46, the term "1-th" should be --I-th--.

In column 3, line 47, the equation "$j=1$" should be --$j=I$--.

UNITED STATES PATENT AND TRADEMARK OFFICE
CERTIFICATE OF CORRECTION

PATENT NO. : 4,654,842
DATED : March 31, 1987
INVENTOR(S) : Giorgio L. Coraluppi, et al It is certified that error appears in the above-indentified patent and that said Letters Patent is hereby corrected as shown below:

In column 3, line 48, the equation "j=1-th" should be --j=I-th--.

In column 3, line 51, the equation "j=1" should be --j=I--.

In column 3, line 52, the equation "$N_1=K_1$" should be --$N_I=K_I$--.

In column 3, line 60, the mathematical expression "$1 \leq j \leq 1$" should be --$1 \leq j \leq I$--.

In column 3, line 61, the mathematical expression "$2 \leq j \leq 1$" should be --$2 \leq j \leq I$--.

In column 4, line 8, the mathematical expression "$1 \leq i \leq 1$" should be --$1 \leq i \leq I$--.

In column 4, line 14, the term "1-th" should be --I-th--.

In column 4, line 16, the equation "$R_1=1$" should be --$R_I=1$--.

In column 4, line 17, the mathematical expression "j<1" should be --j<I--.

In column 4, line 17, the mathematical expression "$j \leq 1$" should be --$j \leq I$--.

UNITED STATES PATENT AND TRADEMARK OFFICE
CERTIFICATE OF CORRECTION

PATENT NO. : 4,654,842

DATED : March 31, 1987

INVENTOR(S) : Giorgio L. Coraluppi, et al

It is certified that error appears in the above-indentified patent and that said Letters Patent is hereby corrected as shown below:

In column 4, line 20, the mathematical expression "j>1" should be --j>I--.

In column 4, line 21, the mathematical expression "$j \geq (1+1)$" should be --$j \geq (I+1)$--.

In column 4, line 27, the term "1-th" should be --I-th--.

In column 4, line 29, the mathematical expression "$M(1,k_2,k_3,...,k_1)$, where $1 \leq k_1 \leq S_1$" should be --$M(I,k_2,k_3,...,k_I)$, where $1 \leq k_I \leq S_I$--.

In column 4, line 33, the mathematical expression "$i \leq 1$" should be --$i \leq I$--.

In column 4, line 36, the mathematical expression "$i \leq 1$" should be --$i \leq I$--.

In column 4, line 45, the term "1-th" should be --I-th--.

In column 4, line 47, the term "(1+1)-th" should be --(I+1)-th--.

In column 4, line 49, the equation "j=1-1" should be --j=I-1--.

In column 4, line 50, the term "$S_1$" should be --$S_I$--.

UNITED STATES PATENT AND TRADEMARK OFFICE
CERTIFICATE OF CORRECTION

PATENT NO. : 4,654,842

DATED : March 31, 1987

INVENTOR(S) : Giorgio L. Coraluppi, et al

Page 4 of 13

It is certified that error appears in the above-indentified patent and that said Letters Patent is hereby corrected as shown below:

In column 4, line 53, the mathematical expression "$R_{(1-1)} \equiv S_1 \equiv R_{(1+1)}$" should be --$R_{(I-1)} \equiv S_I \equiv R_{(I+1)}$--.

In column 4, line 54, the mathematical expression "$2 \leq j \leq 1$" should be --$2 \leq j \leq I$--.

In column 5, line 3, the mathematical expression "$2 \leq i \leq 1$" should be --$2 \leq i \leq I$--.

In column 5, line 15, the mathematical expression "$1 \leq i \leq 1$" should be --$1 \leq i \leq I$--.

In column 5, approximately line 32, the equation "$\Psi = 1-1$" should be --$\Psi = I-1$--.

In column 5, approximately line 32, the equation "$\Psi = 1$" should be --$\Psi = I$--.

In column 5, line 45, the mathematical expression "$i < 1$" should be --$i < I$--.

In column 5, line 45, the mathematical expression "$f_j > 1$" should be --$f_j > I$--.

In column 5, lines 59 and 60, the parenthetical phrase "(i.e., $f_i = 1$, $1 \leq i \leq 1-1$)" should be --(i.e., $f_i = 1$, $1 \leq i \leq I-1$)--.

UNITED STATES PATENT AND TRADEMARK OFFICE
CERTIFICATE OF CORRECTION

PATENT NO. : 4,654,842

DATED : March 31, 1987

INVENTOR(S) : Giorgio L. Coraluppi, et al

It is certified that error appears in the above-indentified patent and that said Letters Patent is hereby corrected as shown below:

In column 5, at approximately line 64, in the second line of the footnote, the mathematical expression "$1 \leq i \leq 1-1$" should be --$1 \leq i \leq I-1$--.

In column 6, line 1, the term "$LRE_1(X,k_2,...,k_i)$" should be --$LRE_L(X,k_2,...k_i)$--.

In column 6, line 43, the mathematical expression "$1 \leq i \leq 1$" should be --$1 \leq i \leq I$--.

In column 6, at approximately line 51, the equation $$"K^{(I-1)} \leq N_T \cdot \prod_{i=1}^{(I-1)} f_i \leq K^I."$$

should be $$--K^{(I-1)} \leq N_T \cdot \prod_{i=1}^{(I-1)} f_i \leq K^I.--$$

UNITED STATES PATENT AND TRADEMARK OFFICE
CERTIFICATE OF CORRECTION

PATENT NO. : 4,654,842

DATED : March 31, 1987

INVENTOR(S) : Giorgio L. Coraluppi, et al

It is certified that error appears in the above-indentified patent and that said Letters Patent is hereby corrected as shown below:

In column 6, at approximately line 63, the equation $$"N_T \cdot \prod_{i=1}^{(1-1)} fi = K^I,"$$

should be $$--N_T \cdot \prod_{i=1}^{(I-1)} f_i = K^I, --.$$

In column 6, line 66, the term "$f_{(1-1)}$" should be --$f_{(I-1)}$--.

In column 8, line 48, the expression "$LRE_R(1,1),-$" should be --$LRE_R(1,1),$--

In column 9, line 38, the numeral "1" (both occurrences) should be --I--.

In column 9, line 39, the mathematical expression "$i \leq 1$" should be --$i \leq I$--.

In column 9, line 43, the mathematical expression "$i \leq 1$" (both occurrences) should be --$i \leq I$--.

In column 9, line 45, the term "1-th" should be --I-th--.

UNITED STATES PATENT AND TRADEMARK OFFICE
CERTIFICATE OF CORRECTION

PATENT NO. : 4,654,842

DATED : March 31, 1987

INVENTOR(S) : Giorgio L. Coraluppi, et la

It is certified that error appears in the above-indentified patent and that said Letters Patent is hereby corrected as shown below:

In column 9, line 46, the term "$D_l$ domain" should be --$D_I$ domain--.

In column 10, line 1, the mathematical expression "i<l" should be --i<I--.

In column 10, line 10, the mathematical expression ""$1 \leq k_{j+1}$-" should be --$1 \leq k_{j+1}$--.

In column 10, line 17, the numeral "l" should be --I--.

In column 10, line 18, the term "l-th" should be --I-th--.

In column 10, line 19, the parenthetical phrase "(or to the l-th and (l+1)-th stages when $\theta$ is even)" should be --(or to the I-th and (I+1)-th stages when $\theta$ is even)--.

In column 10, line 20, the term "$D_l$ control" should be --$D_I$ control--.

In column 10, line 66, the term "l-th" should be --I-th--.

In column 10, line 66, the expression "(l+1)-th" should be --(I+1)-th--.

In column 13, line 58, the term "$l_p$" should be --$I_p$--.

UNITED STATES PATENT AND TRADEMARK OFFICE
CERTIFICATE OF CORRECTION

PATENT NO. : 4,654,842
DATED : March 31, 1987
INVENTOR(S) : Giorgio L. Coraluppi, et al It is certified that error appears in the above-indentified patent and that said Letters Patent is hereby corrected as shown below:

In column 13, line 61, the term "$1_v$" should be --$I_v$--.

In column 14, line 13, the expression "$K_1, K_2, \ldots, K_l$" should be --$K_1, K_2, \ldots, K_I$--.

In column 14, line 22, the expression "l-th" should be --I-th--.

In column 14, line 23, the expression "(l+1)-th" should be --(I+1)-th--.

In column 14, lines 25 and 26, the phrase "caross-couplings" should be --cross-couplings--.

In column 14, line 28, the mathematical expression "$f_1, f_2, \ldots, f_l-1,$" should be --$f_1, f_2, \ldots, f_I-1,$--.

In column 14, line 29, the term "patters" should be --patterns--.

In column 14, line 30, the mathematical expression "$1 \leq t \leq K_l$" should be --$1 \leq t \leq K_I$--.

In column 14, line 30, the term "$o_t(l)$" should be --$o_t(I)$--.

In column 14, line 31, the mathematical expression "$i_t(l+1)$" should be --$i_t(I+1)$--.

UNITED STATES PATENT AND TRADEMARK OFFICE
CERTIFICATE OF CORRECTION

PATENT NO. : 4,654,842

DATED : March 31, 1987

INVENTOR(S) : Giorgio L. Coraluppi, et al

It is certified that error appears in the above-indentified patent and that said Letters Patent is hereby corrected as shown below:

In column 14, line 33, the term "$o_t(1)$" should be --$o_t(I)$--.

In column 14, line 34, the mathematical expression "$i_{(t+1)}(1+1)$" should be --$i_{(t+1)}(I+1)$--.

In column 14, line 34, the "$o_t(1)$" should be --$o_t(I)$--.

In column 14, line 35, the mathematical expression "$i_{(t-1)}(1+1)$" should be --$i_{(t-1)}(I+1)$--.

In column 14, line 36, the mathematical expression "$1 \leq j \leq (1-1)$" should be --$1 \leq j \leq (I-1)$--.

In column 14, line 37, the mathematical expression "$M(1,k_2k_3,\ldots,k_1)$" should be --$M(I,k_2k_3,\ldots,k_I)$--.

In column 14, line 40, the mathematical expression "$f_j-1$" should be --$f_j=1$--.

In column 14, line 44, the mathematical expression "$LRE_L(1,k_2,k_3,\ldots,k_C=a,\ldots,k_1)$" should be --$LRE_L(1,k_2,k_3,\ldots,k_C=a,\ldots,k_I)$--.

In column 14, line 45, the mathematical expression "$LRE_R(1,k_2,k_3,\ldots,k_C=b,\ldots,k_1)$" should be --$LRE_R(1,k_2,k_3,\ldots,k_C=b,\ldots,k_I)$--.

UNITED STATES PATENT AND TRADEMARK OFFICE
CERTIFICATE OF CORRECTION

PATENT NO. : 4,654,842

DATED : March 31, 1987

INVENTOR(S) : Giorgio L. Coraluppi, et al

It is certified that error appears in the above-indentified patent and that said Letters Patent is hereby corrected as shown below:

In column 14, lines 46 and 47, the mathematical expression "$LRE_L(1,k_2,k_3,\ldots,k_C=b,\ldots,k_1)$" should be --$LRE_L(1,k_2,k_3,\ldots,k_C=b,\ldots,k_I)$--.

In column 14, lines 47 and 48, the mathematical expression "$LRE_R(1,k_2,k_3,\ldots,k_C=a,\ldots,k_1)$ should be --$LRE_R(1,k_2,k_3,\ldots,k_C=a,\ldots,k_I)$--.

In column 15, line 1, term "1-th" should be --I-th--.

In column 15, line 2, the mathematical expression "(1+1)-th" should be --(I+1)-th--.

In column 15, line 2, the term "1-th" should be --I-th--.

In column 15, line 3, the term "(1+1)-th" should be --(I+1)-th--.

In column 15, line 5, the term "(1+1)-th" should be --(I+1)-th--.

In column 15, line 7, the term "1-th" should be --I-th--.

In column 15, line 7, the term "(1+1)-th" should be --(I+1)-th--.

In column 15, line 8, the term "1-th" should be --I-th--.

UNITED STATES PATENT AND TRADEMARK OFFICE
CERTIFICATE OF CORRECTION

PATENT NO. : 4,654,842

DATED : March 31, 1987

INVENTOR(S) : Giorgio L. Coraluppi, et al

It is certified that error appears in the above-indentified patent and that said Letters Patent is hereby corrected as shown below:

In column 15, line 11, the term "$K_l$ inputs" should be --$K_I$ inputs--.

In column 15, line 11, the "$K_l$ outputs" should be --$K_I$ outputs--.

In column 15, line 35, the term "ture" should be --true--.

In column 15, line 54, the term "satisfyng" should be --satisfying--.

In column 15, line 66, the mathematical expression "$f_j>1$, $1\leq i \leq k \leq (1-1)$" should be --$f_j>1$, $1 \leq i \leq k \leq (I-1)$--.

In column 15, line 68, the term "1-th" should be --I-th--.

In column 16, line 7, the mathematical expression "$f_k>2$" should be --$f_k \geq 2$--.

In column 16, line 11, the term "than" should be --when--.

In column 16, line 54, the mathematical expression "$1/\theta$" should be --$I/\theta$--.

In column 17, line 48, the term "11A-" should be --11A--.

UNITED STATES PATENT AND TRADEMARK OFFICE
CERTIFICATE OF CORRECTION

PATENT NO. : 4,654,842
DATED : March 31, 1987
INVENTOR(S) : Giorgio L. Coraluppi, et al It is certified that error appears in the above-indentified patent and that said Letters Patent is hereby corrected as shown below:

In Claim 2, column 18, line 4, the term "l-th" should be --I-th--.

In Claim 2, column 18, line 4, the term "(l+1)-th" should be --(I+1)-th--.

In Claim 2, column 18, line 5, the mathematical expression "$l=\theta/1$" should be --$I=\theta/2$--.

In Claim 11, column 19, line 2, the mathematical expression "$j \leq l$" should be --$j \leq I$--.

In Claim 11, column 19, line 8, the mathematical expression "$l = (\theta + 1)/2$, when $\theta$ is odd; and" should be --$I = (\theta + 1)/2$, when $\theta$ is odd; and--.

In Claim 11, column 19, line 12, the mathematical expression "$\Psi = l - 1$, when $\theta$ is odd; and" should be --$\Psi = I - 1$, when $\theta$ is odd; and--.

In Claim 11, column 19, line 14, the mathematical expression "$=l$ when $\theta$ is even;" should be --$=I$ when $\theta$ is even;--.

In Claim 12, column 20, line 3, the mathematical expression "$l \leq i < l$" should be --$1 \leq i < I$--.

UNITED STATES PATENT AND TRADEMARK OFFICE
CERTIFICATE OF CORRECTION

PATENT NO. : 4,654,842
DATED : March 31, 1987
INVENTOR(S) : Giorgio L. Coraluppi, et al It is certified that error appears in the above-indentified patent and that said Letters Patent is hereby corrected as shown below:

In Claim 12, column 20, lines 8-10, the mathematical expression $$"K^{(I-1)} \leq N_T \cdot \prod_{i=1}^{(I-1)} f_i \leq K^I,"$$

should be $$--K^{(I-1)} \leq N_T \cdot \prod_{i=1}^{(I-1)} f_i \leq K^I,--.$$

Signed and Sealed this

Fifth Day of April, 1994

Attest:

BRUCE LEHMAN

Attesting Officer  Commissioner of Patents and Trademarks